(12) United States Patent
Okada et al.

(10) Patent No.: US 11,592,538 B2
(45) Date of Patent: Feb. 28, 2023

(54) CALIBRATION METHOD, DATA PROCESSING APPARATUS, NON-TRANSITORY COMPUTER-READABLE STORAGE MEDIUM FOR STORING CALIBRATION PROGRAM

(71) Applicant: FUJITSU LIMITED, Kawasaki (JP)

(72) Inventors: Hideo Okada, Atsugi (JP); Hiroshi Uchiyama, Yokohama (JP); Kiyohiko Yanagisawa, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 635 days.

(21) Appl. No.: 16/695,496

(22) Filed: Nov. 26, 2019

(65) Prior Publication Data
US 2020/0096623 A1    Mar. 26, 2020

Related U.S. Application Data

(63) Continuation of application No. PCT/JP2017/025740, filed on Jul. 14, 2017.

(51) Int. Cl.
*G01S 7/497* (2006.01)
*G01S 7/48* (2006.01)
(Continued)

(52) U.S. Cl.
CPC ............ *G01S 7/497* (2013.01); *G01S 7/4808* (2013.01); *G01S 7/491* (2013.01); *G01S 17/06* (2013.01); *G01S 7/51* (2013.01)

(58) Field of Classification Search
CPC ...... G01S 7/4808; G01S 7/4817; G01S 7/491; G01S 7/497; G01S 7/51; G01S 17/06;
(Continued)

(56) References Cited

U.S. PATENT DOCUMENTS

2011/0034300 A1\* 2/2011 Hall .................. A63B 24/0003
482/29
2015/0321039 A1\* 11/2015 Howe ................ A63B 24/0075
482/8

(Continued)

FOREIGN PATENT DOCUMENTS

CN    201055631 Y    5/2008
JP    2009-14481 A    1/2009

OTHER PUBLICATIONS

"FIG Apparatus Norms", Federation Internationale De Gymnastique, [online], 2017, [Search on Jun. 2, 2017], Internet (URL: http://www.fig-gymnastics.com/publicdir/rules/files/app-norms/Apparatus%20Norms%20I-III%20E-%20Version%202017-e_.pdf), 176 pages.

(Continued)

*Primary Examiner* — John H Le
(74) *Attorney, Agent, or Firm* — Fujitsu Patent Center

(57) ABSTRACT

A calibration method implemented by a computer, includes: measuring, with a laser ranging sensor, markers attached to at least two predetermined positions of a bed portion of a trampoline and calculating coordinates of the markers in a first coordinate system with a position of the laser ranging sensor being an origin; and calculating a conversion parameter to convert coordinates of respective positions of the first coordinate system into coordinates of respective positions of a second coordinate system with a center position of the bed portion being an origin based on a relationship between the calculated coordinates of the markers and the at least two predetermined positions of the bed portion.

8 Claims, 23 Drawing Sheets

(51) Int. Cl.
  *G01S 17/06* (2006.01)
  *G01S 7/491* (2020.01)
  *G01S 7/51* (2006.01)

(58) Field of Classification Search
  CPC ......... G01S 17/08; G01S 17/88; G01B 11/00; A63B 5/11; A63B 71/06
  USPC .......................................................... 702/95
  See application file for complete search history.

(56) References Cited

U.S. PATENT DOCUMENTS

2017/0128779 A1* 5/2017 Howe .................... A61B 5/744
2017/0157444 A1  6/2017 Conrad et al.

OTHER PUBLICATIONS

"Time Measurement Device (TMD-3) Datasheet and Instructions", Acrosport Co. Ltd., [online], 2017, [Search on Jun. 2, 2017], Internet (URL: http://acrosport.ru/files/TMD-3_datasheet_en.pdf), pp. 1-10.

Mukai, Kenji et al., "Movements Detection of Trampoline Interface for Support of Health Exercise", IPSJ Interaction 2012, [DVD-ROM], Mar. 15, 2012, pp. 193-198, with English Abstract, Cited in ISR for PCT/JP2017/025740.

Tsujimoto, Norio et al.,"Development of a method to evaluate jumping stability and application of the method to training in trampolining", [online], Japan Society of Sports Performance Research, 2015, [retrieval date Sep. 26, 2017 (Sep. 26, 2017)], Internet<http://sports-performance.jp/paper/1428/1428.pdf>, pp. 99-112, with English Abstract, Cited in ISR for PCT/JP2017/025740.

Trampoline Shinpan Honbu, 2017-2020 Trampoline FIG Saiten Kisoku No. Henkoten, [online], Nov. 18, 2016 (Nov. 18, 2016), [retrieval date Sep. 26, 2017 (Sep. 26, 2017)], Internet<URL:http://www.jpn-gym.or.jp/wp-content/uploads/2016/11/2017-2020_TRA_Rule_updated20161118.pdf>, 6 pages, Cited in ISR for PCT/JP2017/025740.

International Search Report and Written Opinion of the International Searching Authority Form PCT/ISA/210, 220, and 237), mailed in connection with PCT Application No. PCT/JP2017/025740 dated Oct. 10, 2017, 10 pages.

* cited by examiner

FIG. 8
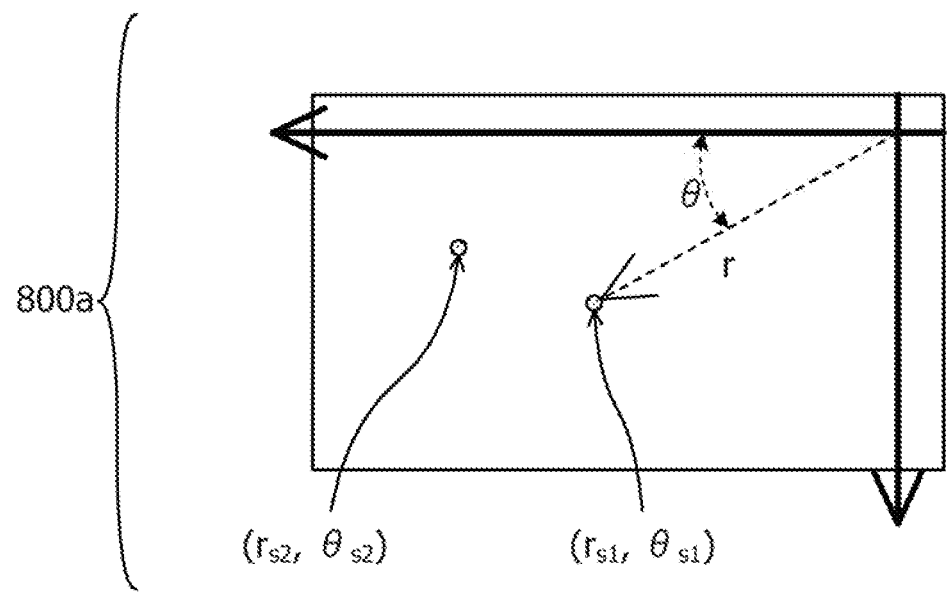
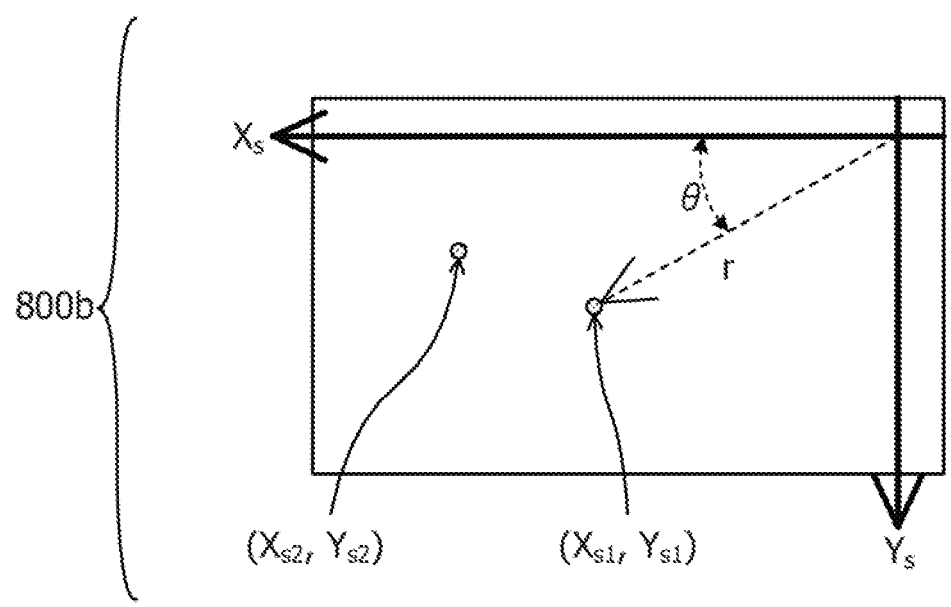

FIG. 14
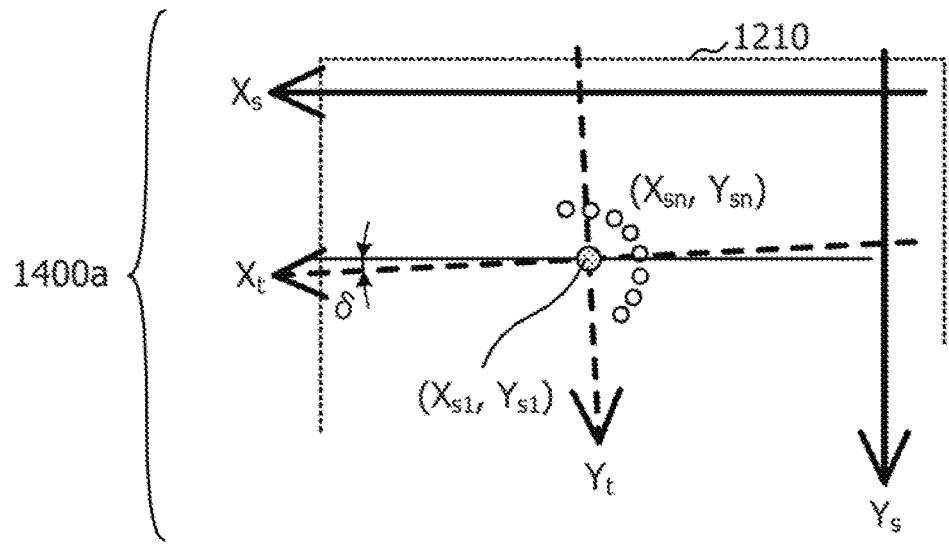
$$\begin{pmatrix} X_{tn} \\ Y_{tn} \end{pmatrix} = \begin{pmatrix} \cos\delta & -\sin\delta \\ \sin\delta & \cos\delta \end{pmatrix} \begin{pmatrix} X_{sn} - X_{st} \\ Y_{sn} - Y_{st} \end{pmatrix}$$
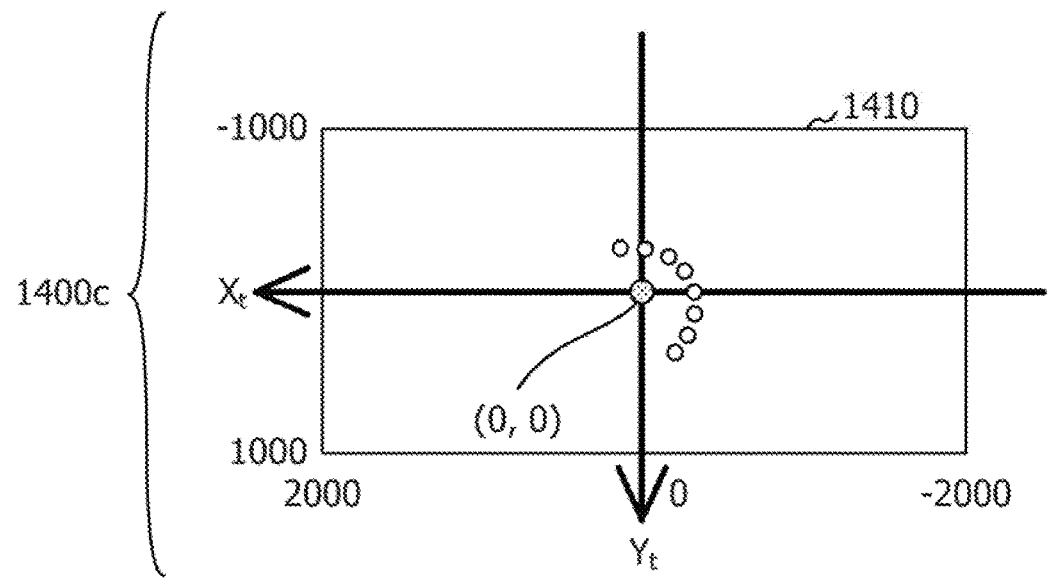

FIG. 15
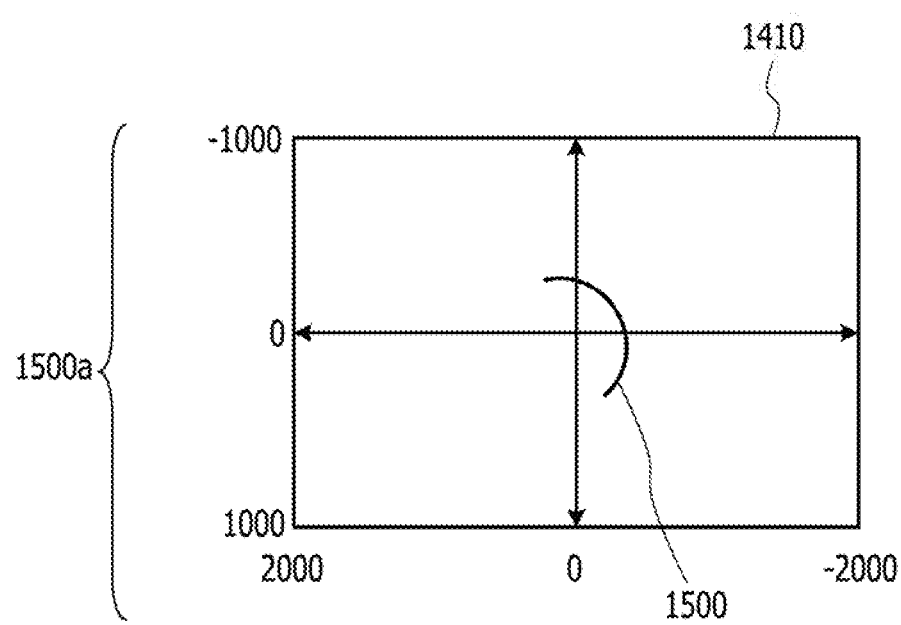
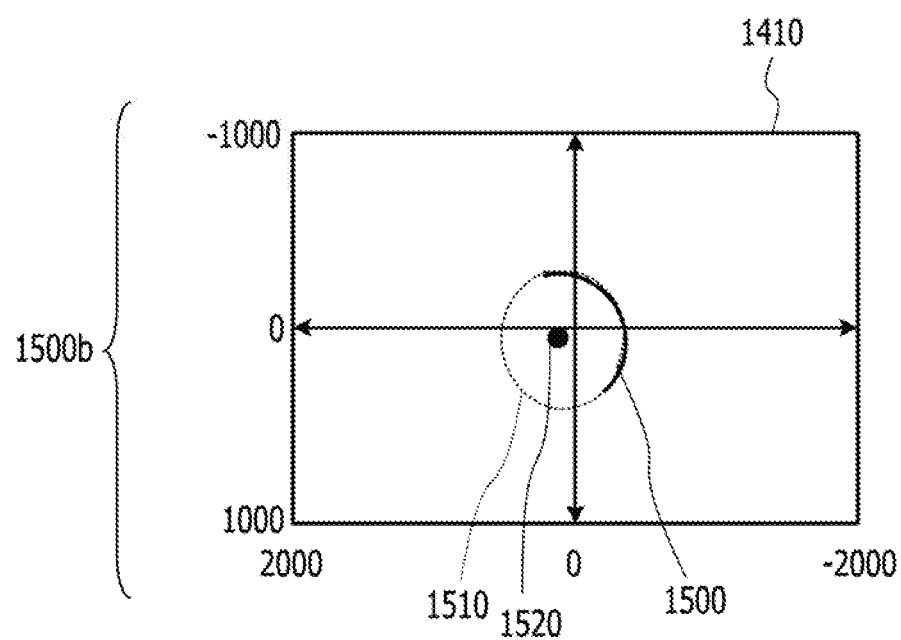

FIG. 18

| SCORE CALCULATION RESULT (COMPETITOR (ID = 0001)) |||
|---|---|---|
| CHANGE TO NON-JUMPING STATE | LANDING POSITION | H SCORE |
| FIRST TIME | $(x_{t1}, y_{t1})$ | 0.0 |
| SECOND TIME | $(x_{t2}, y_{t2})$ | 0.0 |
| ... | ... | ... |
| n-TH TIME | $(x_{tn}, y_{tn})$ | 0.1 |
| TOTAL || 0.7 |

410

| COORDINATE TABLE ||
|---|---|
| ITEM | DIMENSION |
| X1 | $= \dfrac{ABS(X_{t4}) + ABS(X_{t5})}{2}$ |
| X2 | $= \dfrac{ABS(X_{t2}) + ABS(X_{t3})}{2}$ |
| X3 | $= \dfrac{ABS(X_{t6}) + ABS(X_{t7})}{2}$ |
| Y1 | $= \dfrac{ABS(Y_{t3}) + ABS(Y_{t5})}{2}$ |
| Y2 | $= \dfrac{ABS(Y_{t6}) + ABS(Y_{t7})}{2}$ |

2020

| COORDINATE TABLE ||
|---|---|
| ITEM | DIMENSION |
| X1 | = ABS($X_{t4}$) |
| X2 | = ABS($X_{t3}$) |
| X3 | = ABS($X_{t7}$) |
| Y1 | = ABS($Y_{t3}$) |
| Y2 | = ABS($Y_{t7}$) |

CALIBRATION METHOD, DATA PROCESSING APPARATUS, NON-TRANSITORY COMPUTER-READABLE STORAGE MEDIUM FOR STORING CALIBRATION PROGRAM

CROSS-REFERENCE TO RELATED APPLICATION

This application is a continuation application of International Application PCT/JP2017/025740 filed on Jul. 14, 2017 and designated the U.S., the entire contents of which are incorporated herein by reference.

FIELD

The present invention relates to a calibration method, a data processing apparatus, and a non-transitory computer-readable storage medium for storing a calibration program.

BACKGROUND

In various competitions where competitors compete for ranking based on scoring by scorers, a measurement technique for measuring and quantifying movement of a competitor has been conventionally employed, so as to improve fairness of the scoring. For example, in trampolining, a score (T (Time) score: 1 point per second) is added according to a total jump time, and thus a measurement technique is employed that uses a laser light to measure a dent in a bed unit generated in response to landing by the competitor during the competition, and calculates the total jump time.

Here, in the case of trampolining, it has been decided that a landing position (an amount of displacement in a horizontal direction) when the competitor has landed will be scored in the future. Accordingly, a measurement technique for calculating the landing position of the competitor is required in addition to the total jump time of the competitor.

Examples of the related art include "FIG Apparatus Norms", [online], 2017, [Search on Jun. 2, 2017], Internet (URL: http://www.fig-gymnastics.com/publicdir/rules/files/app-norms/Apparatus%20Norms%20201-III%20E-%20Version%202017-e_.pdf), and "TIME MEASUREMENT DEVICE (TMD-3) DATASHEET AND INSTRUCTIONS", [online], 2017, [Search on Jun. 2, 2017], Internet (URL: http://acrosport.ru/files/TMD-3_datasheet_en.pdf).

SUMMARY

According to an aspect of the embodiments, a calibration method implemented by a computer includes: measuring, with a laser ranging sensor, markers attached to at least two predetermined positions of a bed portion of a trampoline and calculating coordinates of the markers in a first coordinate system with a position of the laser ranging sensor being an origin; and calculating a conversion parameter to convert coordinates of respective positions of the first coordinate system into coordinates of respective positions of a second coordinate system with a center position of the bed portion being an origin based on a relationship between the calculated coordinates of the markers and the at least two predetermined positions of the bed portion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a view illustrating a specific example of processing by a marker position determination unit.

FIG. 14 is a view illustrating a specific example of processing by a conversion unit.

FIG. 15 is a view illustrating a specific example of a fitted circular shape.

FIG. 18 is a table illustrating a specific example of a score calculation result.

DESCRIPTION OF EMBODIMENT(S)

Figure 1:
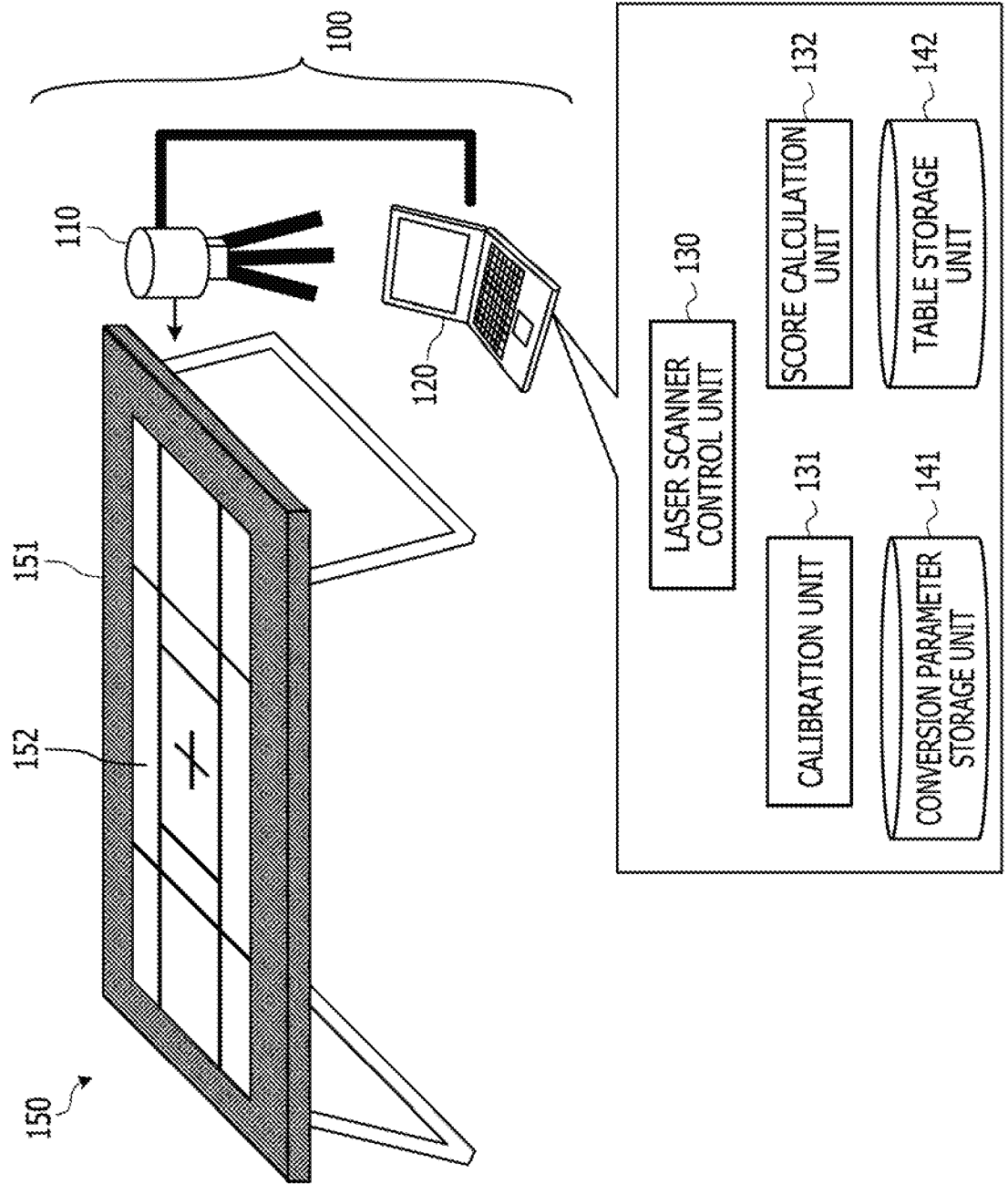
FIG. 1 is a view illustrating an example of a system configuration of a measurement system.

However, in the case of laser light, a scoring line marked on the bed unit cannot be directly measured. Accordingly, in order to achieve scoring according to a calculated landing position, it is necessary to clarify and calibrate in advance which region the calculated landing position corresponds to among regions divided by the scoring lines.

In one aspect, it is an object to provide a calibration method for achieving scoring according to a landing position on a bed unit of a trampoline.

A calibration method for achieving scoring according to a landing position of a bed unit of a trampoline can be provided.

Hereinafter, each of embodiments will be described with reference to the attached drawings. Note that in the description and the drawings, components having substantially the same functional configurations are denoted by the same reference numerals, and redundant descriptions are omitted.

First Embodiment

<System Configuration of Measurement System>

First, a system configuration of a measurement system for measuring and qualifying a motion of a competitor in trampolining will be described. FIG. 1 is a view illustrating an example of a system configuration of a measurement system. As illustrated in FIG. 1, a measurement system 100 has a laser scanner device 110 and a data processing apparatus 120. The laser scanner device 110 and the data processing apparatus 120 are communicatively connected.

The laser scanner device 110 is a laser ranging sensor that has a scan function to execute, in an arbitrary direction in a predetermined plane, a ranging process of measuring a time from emission of a laser light to reception of a reflected light to thereby measure the distance to a measuring object.

In a first embodiment, the laser scanner device 110 is disposed below a bed unit 152 held on a frame 151 of a trampoline 150, and emits a laser light in a direction approximately parallel to the bed unit 152. Thus, the laser scanner device 110 receives reflected light from a dent region generated in the bed unit 152, and can measure a distance to the dent region and a direction of the dent region.

The laser scanner device 110 transmits scan data that includes distance information indicating the distance to the dent region and angle information indicating the direction of the dent region to the data processing apparatus 120.

A laser scanner control program, a calibration program, and a score calculation program are installed in the data processing apparatus 120. The data processing apparatus 120 functions as a laser scanner control unit 130, a calibration unit 131, and a score calculation unit 132 by a CPU executing the programs.

The laser scanner control unit 130 controls start and stop of the laser scanner device 110. Further, the laser scanner control unit 130 sets various parameters to the laser scanner device 110.

The calibration unit 131 calculates conversion parameters for converting scan data transmitted from the laser scanner device 110 into a trampoline coordinate system (second coordinate system), and stores the conversion parameters in the conversion parameter storage unit 141. The trampoline coordinate system is a coordinate system in which a center position of the bed unit 152 is the origin, and an axis parallel to a plurality of scoring lines of the bed unit 152 is a horizontal axis ($X_t$-axis) or a vertical axis ($Y_t$-axis).

The score calculation unit 132 obtains scan data from the laser scanner device 110, and converts the scan data into the trampoline coordinate system using the conversion parameters. The score calculation unit 132 then calculates a cross-sectional shape of a dent region formed in the bed unit 152, and calculates the landing position of the competitor on the bed unit 152. Since the landing position calculated at this time has already been converted into the trampoline coordinate system, the score calculation unit 132 can determine based on coordinates of the landing position which of the regions divided by the plurality of scoring lines the landing position corresponds to.

Specifically, the score calculation unit 132 specifies a score (H score (horizontal displacement)) according to the coordinates of the landing position by referring to a table storage unit 142, and outputs a score calculation result.

<Scanning Direction of Laser Light>

Figure 2:
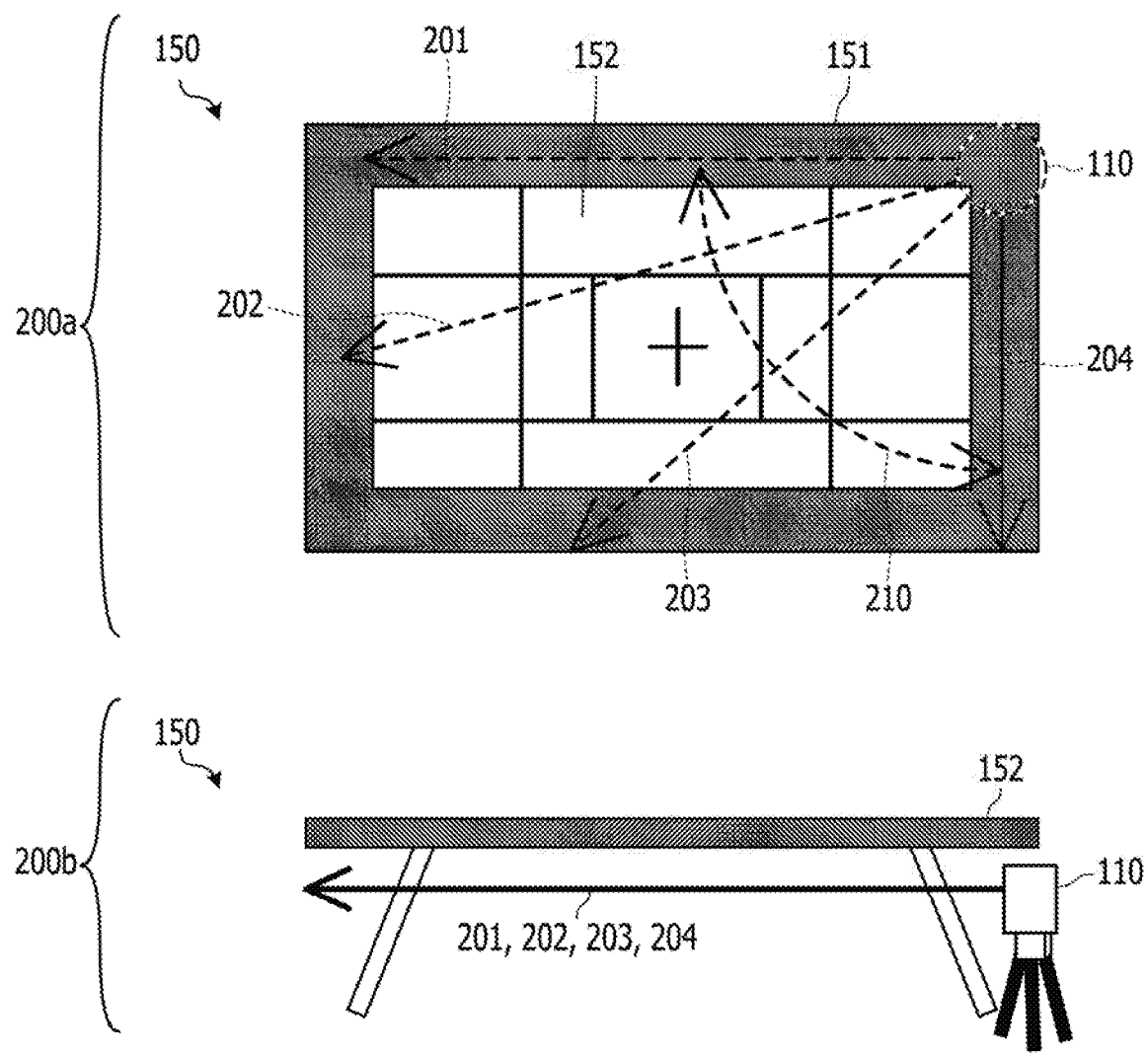
FIG. 2 is a view illustrating a scanning direction of laser lights emitted from a laser scanner device.

Next, a scanning direction of the laser light emitted from the laser scanner device 110 will be described. FIG. 2 is a view illustrating a scanning direction of laser lights emitted from the laser scanner device. Among these, part 200a in FIG. 2 illustrates a state of the trampoline 150 viewed from above, and part 200b in FIG. 2 illustrates a state of the trampoline 150 viewed from a side.

As illustrated in part 200a in FIG. 2, in a case where the laser scanner device 110 is disposed at one of vertex positions of the rectangular frame 151, the laser scanner device 110 emits a laser light in a scan range 210 that ranges from a long side direction to a short side direction of the rectangular frame 151. Note that the laser light 201 indicates a laser light emitted in the long side direction of the frame 151, and the laser light 204 indicates a laser light emitted in the short side direction of the frame 151.

Further, the laser scanner device 110 repeats emission and reception of laser lights while scanning the scan range 210. The laser lights 202, 203 represent examples of the laser lights emitted while scanning the scan range 210.

By setting the entire lower surface of the bed unit 152 as the scan range in this manner, the laser scanner device 110 can measure the distance to a dent region generated in any position of the bed unit 152 and the direction of the dent region.

Further, as illustrated in part 200b in FIG. 2, laser lights (for example, laser lights 201 to 204) emitted by the laser scanner device 110 while scanning the scan range 210 are all approximately parallel to the bed unit 152, and distances of the laser lights from the bed unit 152 are constant.

By scanning in directions approximately parallel to the bed unit 152 in this manner, the laser scanner device 110 can measure the distance to a dent region generated in the bed unit 152 and the direction of the dent region at a certain height position from the bed unit 152.

<Table Stored in Table Storage Unit>

Next, a table stored in the table storage unit 142 will be described. In the first embodiment, it is assumed that the table storage unit 142 stores a region table, a coordinate table, and a deduction table.

(1) Region Table

Figure 3:
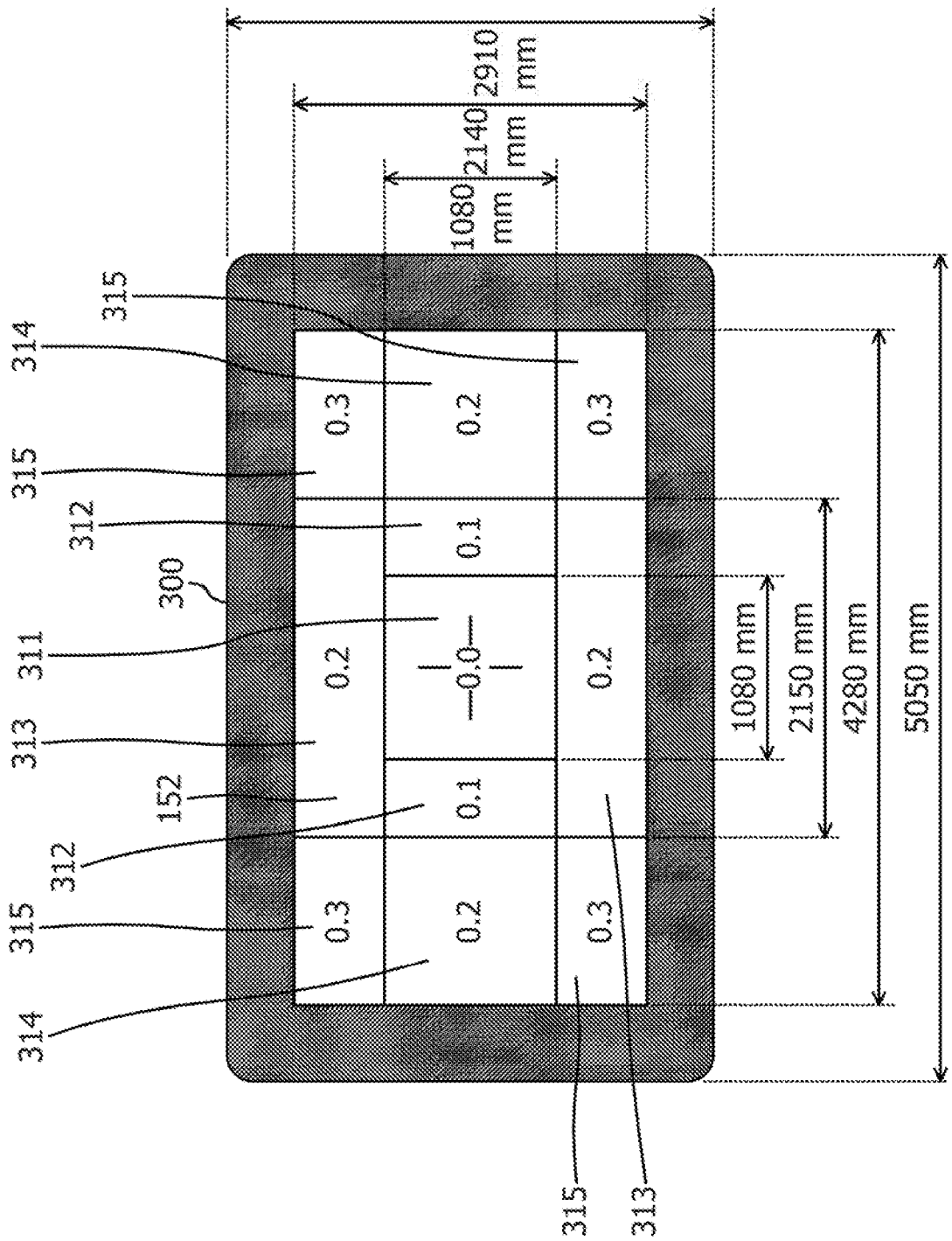
FIG. 3 is a view illustrating an example of a region table of H score.

Next, a region table of H score stored in the table storage unit 142 will be described. FIG. 3 is a view illustrating an example of the region table of H score. As illustrated in FIG. 3, the region table 300 of H score is generated by dividing the bed unit 152 into a plurality of regions by a plurality of scoring lines and assigning an H score to each of the regions.

As illustrated in FIG. 3, the trampoline 150 has a size of 2910 [mm] in length and 5050 [mm] in width, in which the bed unit 152 has a size of 2140 [mm] in length and 4280 [mm] in width.

In trampolining, the bed unit 152 of the relevant size is divided into five types of regions (11 sections) for scoring the H score. Note that the H score is scored by a deduction system.

Specifically, a region 311 with a length of 1080 [mm] and a width of 1080 [mm] including the center position of the bed unit 152 is set as a region where the H score is 0.0 point.

When the landing position of a competitor is included in the region 311, the competitor will not be deducted.

Further, regions 312 obtained by excluding the region 311 from a region with a length of 1080 [mm] and a width of 2150 [mm] including the center position of the bed unit 152 are set as regions where the H score is 0.1 point. When the landing position of the competitor is included in a region 312, the competitor will be deducted by 0.1 point.

Further, regions 313 obtained by excluding the regions 311, 312 from a region with a length of 2140 [mm] and a width of 2150 [mm] including the center position of the bed unit 152 are set as regions where the H score is 0.2 point. When the landing position of the competitor is included in a region 313, the competitor will be deducted by 0.2 point.

Further, regions 314 obtained by excluding the regions 311, 312 from a region with a length of 1080 [mm] and a width of 4280 [mm] including the center position of the bed unit 152 are set as regions where the H score is 0.2 point. When the landing position of the competitor is included in a region 314, the competitor will be deducted by 0.2 point.

Moreover, regions 315 other than the regions 311 to 314 described above in the bed unit 152 are set as regions where the H score is 0.3 point. When the landing position of the competitor is included in a region 315, the competitor will be deducted by 0.3 point.

(2) Coordinate Table and Deduction Table

Next, the coordinate table and the deduction table stored in the table storage unit 142 will be described. As will be described later, the data processing apparatus 120 manages the landing position of a competitor with the trampoline coordinate system. Therefore, the table storage unit 142 stores a coordinate table in which each region of a region table 300 is defined based on the trampoline coordinate system with the center position of the bed unit 152 being an origin, and a deduction table in which the H score is defined based on the trampoline coordinate system.

Figure 4:
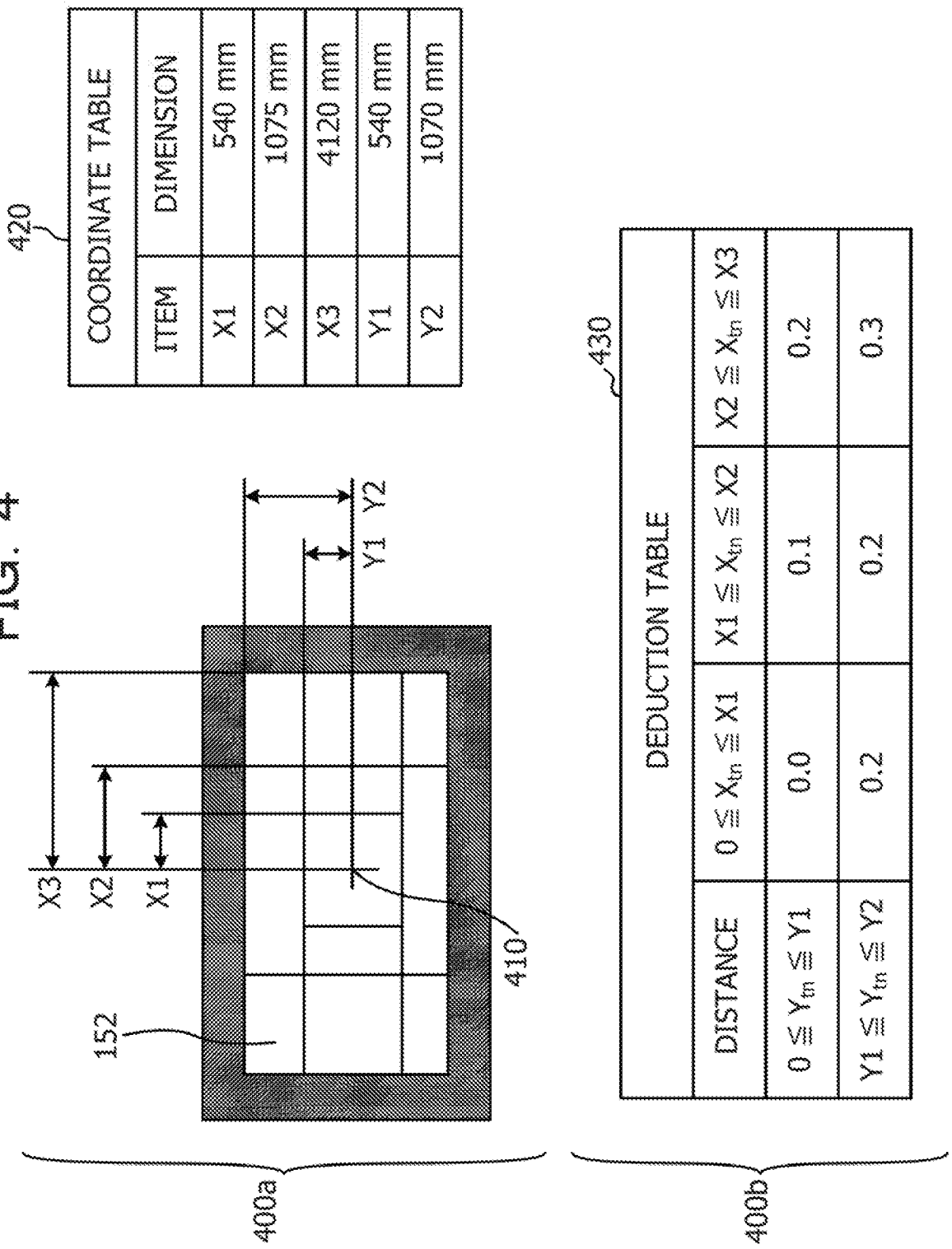
FIG. 4 is a diagram illustrating an example of a coordinate table and a deduction table used for scoring H scores.

FIG. 4 is a diagram illustrating an example of the coordinate table and the deduction table used for scoring of the H score. Among these, part 400a illustrates an example of the coordinate table. As illustrated in 400a, in the trampoline coordinate system with the center position of the bed unit 152 being the origin, dimensions in an $X_t$-axis direction and a $Y_t$-axis direction from the origin 410 to boundary points of respective regions are X1 to X3, Y1, Y2. In this case, the respective dimensions are as presented in a coordinate table 420.

Further, part 400b illustrates an example of the deduction table. Assuming that the landing position of the competitor ($X_t$ coordinates and $Y_t$ coordinates in the trampoline coordinate system) is ($X_{tn}$, $Y_{tn}$), the relationship between the landing position of the competitor ($X_{tn}$, $Y_{tn}$) and the H score is as illustrated in a deduction table 430.

For example, when the landing position of the competitor ($X_{tn}$, $Y_{tn}$) is $0 \leq X_{tn} \leq X1$ and $0 \leq Y_{tn} \leq Y1$, the competitor will not be deducted. On the other hand, when the landing position of the competitor ($X_{tn}$, $Y_{tn}$) is $0 \leq X_{tn} \leq X1$ and $Y1 \leq Y_{tn} \leq Y2$, the competitor will be deducted by 0.2 points.

<Hardware Configuration of Data Processing Apparatus>

Figure 5:
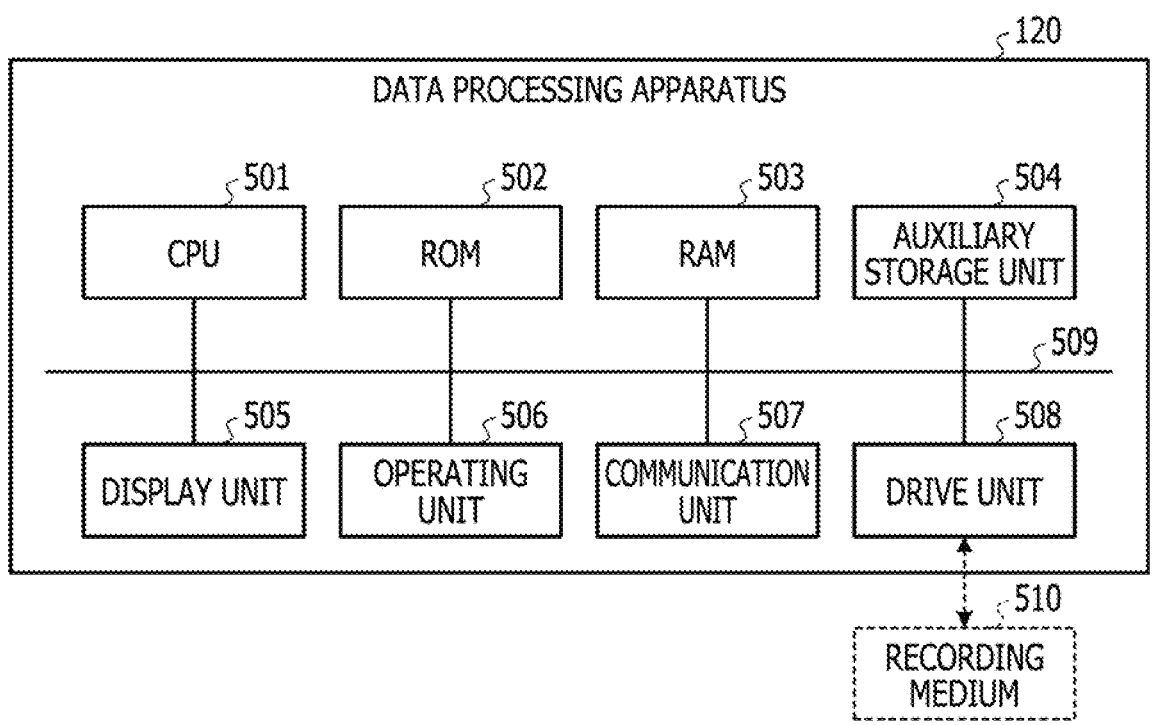
FIG. 5 is a diagram illustrating an example of a hardware configuration of a data processing apparatus.

Next, a hardware configuration of the data processing apparatus 120 will be described. FIG. 5 is a diagram illustrating an example of a hardware configuration of the data processing apparatus.

As illustrated in FIG. 5, the data processing apparatus 120 has a central processing unit (CPU) 501, a read only memory (ROM) 502, and a random access memory (RAM) 503. The CPU 501, the ROM 502, and the RAM 503 form what is called a computer. Further, the data processing apparatus 120 includes an auxiliary storage unit 504, a display unit 505, an operating unit 506, a communication unit 507, and a drive unit 508. Note that the respective units of the data processing apparatus 120 are connected to one another via a bus 509.

The CPU 501 executes various programs (for example, the laser scanner control program, the calibration program, the score calculation program, or the like) installed in the auxiliary storage unit 504.

The ROM 502 is a nonvolatile memory. The ROM 502 functions as a main storage device that stores various programs, data, and the like necessary for the CPU 501 to execute the various programs installed in the auxiliary storage unit 504. More specifically, the ROM 502 stores a boot program or the like of a basic input/output system (BIOS), an extensible firmware interface (EFI), and the like.

The RAM 503 is a volatile memory such as a dynamic random access memory (DRAM) or a static random access memory (SRAM). The RAM 503 functions as a main storage device that provides a work area expanded when the CPU 501 executes the various programs installed in the auxiliary storage unit 504.

The auxiliary storage unit 504 is an auxiliary storage device that stores various programs installed in the data processing apparatus 120, data used when the various programs are executed, and the like. The conversion parameter storage unit 141 and the table storage unit 142 described above are achieved in the auxiliary storage unit 504.

The display unit 505 is a display device that displays a processing result or the like (for example, a score calculation result) by the data processing apparatus 120. The operating unit 506 is an operating device used when an administrator or the like of the measurement system 100 inputs various instructions (for example, a measurement start instruction and a measurement end instruction to be described below) to the data processing apparatus 120. The communication unit 507 is a communication device for the data processing apparatus 120 to communicate with the laser scanner device 110 and the like.

The drive unit 508 is a device for setting a recording medium 510. The recording medium 510 mentioned here includes a medium for optically, electrically, or magnetically recording information, such as a CD-ROM, a flexible disk, or a magneto-optical disk. Alternatively, the recording medium 510 may include a semiconductor memory or the like that electrically records information, such as a ROM or a flash memory.

Note that the various programs stored in the auxiliary storage unit 504 are installed by, for example, setting a distributed recording medium 510 to the drive unit 508 and reading the various programs recorded on the recording medium 510 by the drive unit 508. Alternatively, the various programs stored in the auxiliary storage unit 504 may be installed by being downloaded from a network via the communication unit 507.

<Functional Configuration of Data Processing Apparatus (Calibration Unit)>

Next, a functional configuration of the data processing apparatus 120 will be described. As described above, the data processing apparatus 120 functions as the laser scanner control unit 130, the calibration unit 131, and the score calculation unit 132. Here, a functional configuration of the calibration unit 131 will be described in detail.

(1) Details of Functional Configuration of Calibration Unit

Figure 6:
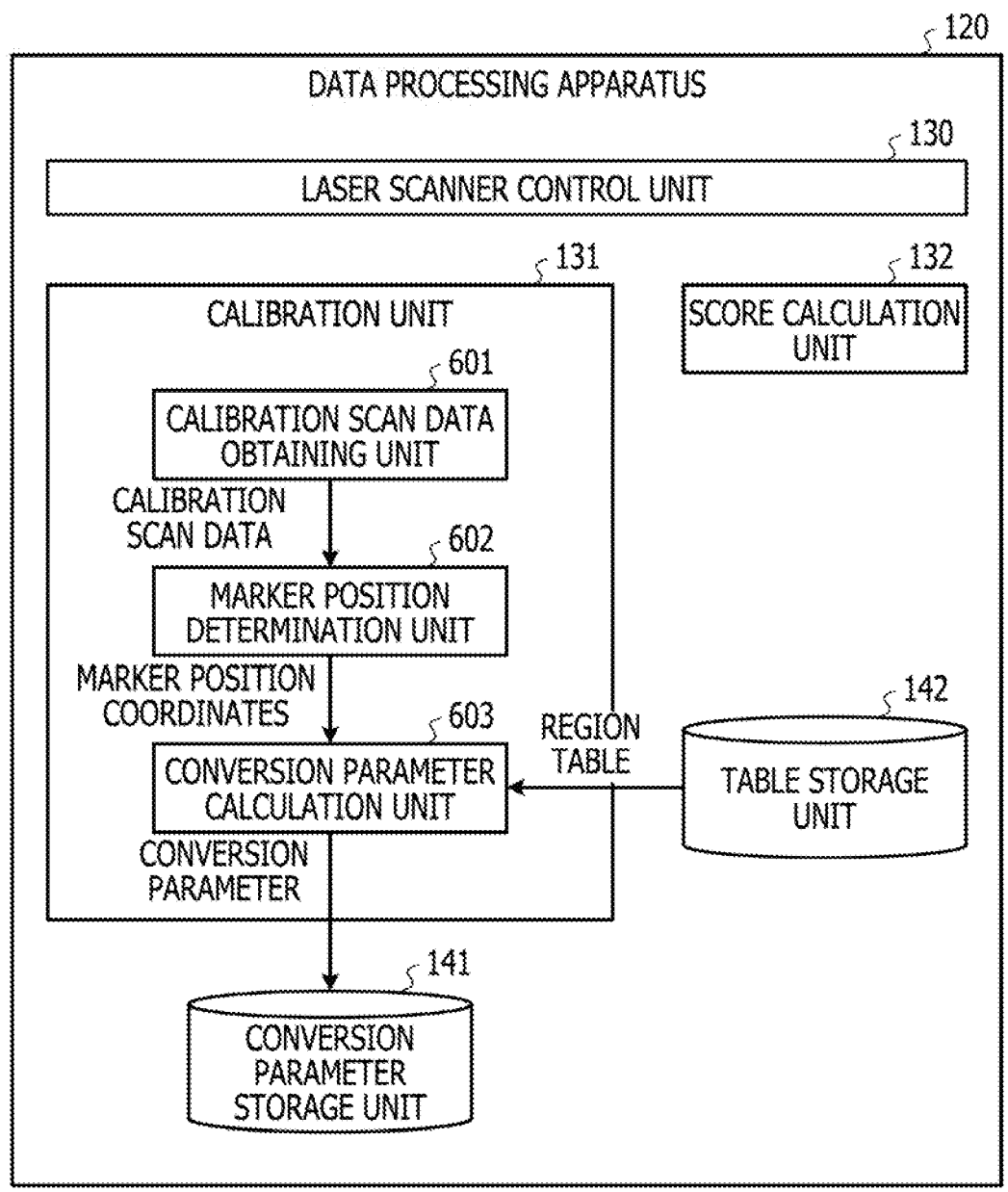
FIG. 6 is a diagram illustrating an example of a functional configuration of a calibration unit of the data processing apparatus.

FIG. 6 is a diagram illustrating an example of a functional configuration of the calibration unit of the data processing apparatus. As illustrated in FIG. 6, the calibration unit 131 has a calibration scan data obtaining unit 601, a marker position determination unit 602, and a conversion parameter calculation unit 603.

The calibration scan data obtaining unit 601 obtains, as calibration scan data from the laser scanner device 110, scan data obtained by the laser scanner device 110 performing scanning with calibration markers being attached to two predetermined positions of the bed unit 152. Further, the calibration scan data obtaining unit 601 notifies the marker position determination unit 602 of the obtained calibration scan data.

The marker position determination unit 602 is an example of a first calculation unit. The marker position determination unit 602 calculates coordinates (marker position coordinates) of a position where a calibration marker is attached based on the calibration scan data notified from the calibration scan data obtaining unit 601. The marker position determination unit 602 calculates marker position coordinates as coordinates in a scanner coordinate system (first coordinate system) in which the position where the laser scanner device 110 is disposed is the origin, a long side direction of the bed unit 152 is a horizontal axis ($X_s$-axis), and a short side direction thereof is a vertical axis ($Y_s$-axis). Further, the marker position determination unit 602 notifies the conversion parameter calculation unit 603 of the calculated marker position coordinates.

The conversion parameter calculation unit 603 is an example of a second calculation unit. The conversion parameter calculation unit 603 refers to the region table 300 stored in the table storage unit 142, and calculates a conversion parameter that matches the marker position coordinates notified from the marker position determination unit 602 with the corresponding position in the region table 300. The conversion parameter includes a correction amount in the long side direction of the bed unit 152, a correction amount in the short side direction, and a correction amount in a rotation direction around the origin. The conversion parameter calculation unit 603 stores the calculated conversion parameter in the conversion parameter storage unit 141.

(2) Marker and Attachment Positions of Markers

Next, an exterior appearance configuration of a marker for calibration attached to two predetermined positions of the bed unit 152 and attachment positions of markers for calibration will be described.

Figure 7:
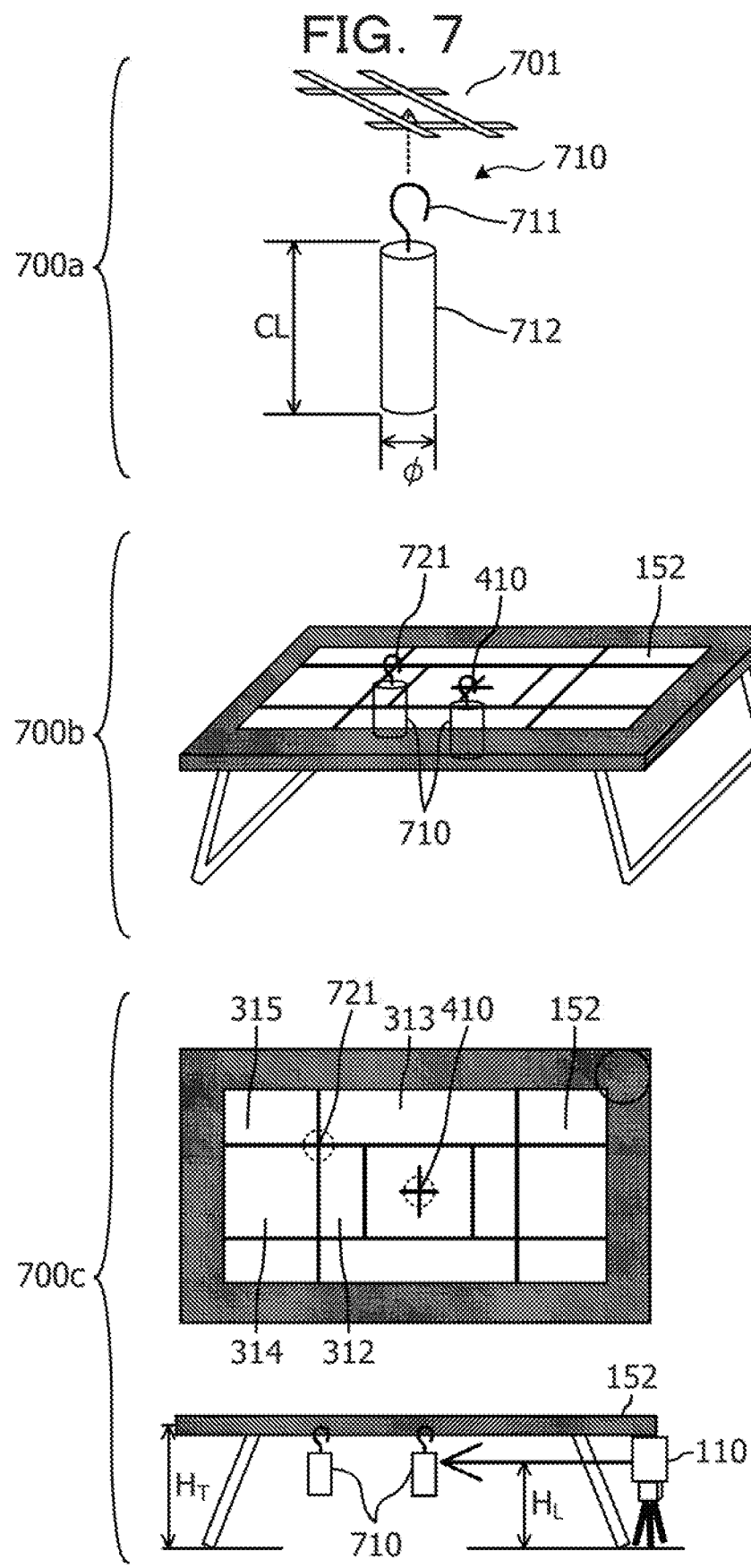
FIG. 7 is a view for explaining an exterior appearance configuration of a marker and attachment positions of markers.

FIG. 7 is a view for explaining an exterior appearance configuration of a marker and attachment positions of markers. Among these, part 700a illustrates the exterior appearance configuration of the marker. As illustrated in 700a, the marker 710 has a hook portion 711 for attaching to the bed unit 152, and a main body 712 that reflects a laser light emitted from the laser scanner device 110.

The hook portion 711 is an engaging member for suspending the main body 712 from the bed unit 152, and has a hook shape. As illustrated in 700a, the bed unit 152 is formed in a mesh shape (see reference sign 701), and the main body 712 can be easily attached to the bed unit 152 by having the hook shape.

The main body 712 has a cylindrical shape. A condition of a length CL of the main body 712 is to be longer than a distance between a laser beam emitted in a direction substantially parallel to the bed unit 152 and the bed unit 152. In the first embodiment, the length CL of the main body 712 is, for example, 100 [mm].

A diameter $\varphi$ of the main body 712 is calculated based on a scan pitch of the laser light. In the first embodiment, the diameter $\varphi$ of the main body 712 is calculated to be capable of reflecting a laser light even when the marker 710 is attached to the position (diagonal position) farthest from the laser scanner device 110 where the marker 710 can be attached to the bed unit 152.

Specifically, assuming that a scan pitch of the laser beam at a diagonal position is P, a distance (maximum distance) from the laser scanner device 110 to the diagonal position of the bed unit 152 is L, and an angular resolution of the laser scanner device 110 is Θ, the scan pitch P is calculated based on the following expression.

$$P = L \times \sin \Theta$$

Therefore, when the diameter $\varphi$ of the main body 712 is defined to be twice or more the scan pitch P, the diameter $\varphi$ of the main body 712 satisfies the following expression.

$$\varphi \leq 2 \times L \times \sin \Theta (= 2 \times P)$$

Here, when the distance L=4.5 [m] and the angular resolution Θ=0.2 [degree], P=15.7 [mm] and the diameter $\varphi$ is calculated to be 31.4 [mm] or more. Note that in the first embodiment, the diameter $\varphi$ of the main body 712 is 32 [mm]. Thus, the laser beam can be reliably reflected irrespective of the attachment position of the marker 710.

Part 700b is a perspective view illustrating attachment positions of markers 710, and part 700c is a top view and a side view illustrating the attachment positions of the markers 710. As illustrated in the perspective view of 700b and the top view of 700c, in the first embodiment, a marker 710 is attached to the center position of the bed unit 152 (the position of the origin 410). Moreover, a marker 710 is attached to the position of a vertex of one of the regions of the bed unit 152. The example of the perspective view of 700b and the top view of 700c illustrates that the marker 710 is attached to the position of a vertex 721 shared by the region 312, the region 313, the region 314, and the region 315.

Further, as illustrated in the side view of 700c, when the markers 710 are respectively attached to the center position (the position of the origin 410) and the position of the vertex 721, laser lights emitted from the laser scanner device 110 are reflected by the respective markers 710. Thus, the respective reflected lights are received by the laser scanner device 110. Consequently, the calibration scan data obtaining unit 601 can obtain calibration scan data from the laser scanner device 110.

Note that reference sign HT presented in the side view of 700c denotes the height of the trampoline which is, for example, 1155 [mm]. Further, reference sign HL denotes the height of an emission port of the laser scanner device 110 which is, for example, 850 [mm]. That is, by setting the length of the hook portion 711 to approximately 255 [mm], a laser light can be irradiated to the center position in a height direction of the main body 712.

(3) Specific Example of Processing by Marker Position Determination Unit

Next, a specific example of processing by the marker position determination unit 602 will be described. FIG. 8 is a view illustrating a specific example of processing by the marker position determination unit. Among these, part 800a illustrates an example of calibration scan data notified from the calibration scan data obtaining unit 601.

As illustrated in 800a, the calibration scan data includes distance information (r) indicating the distance from the laser scanner device 110 to a marker 710, and angle information (θ) indicating the direction of the marker 710 when viewed from the laser scanner device 110. The example of 800a indicates that the calibration scan data for the marker 710 attached to the center position (the position of the origin 410) is $(r_{s1}, \theta_{s1})$. Further, the example of 800a indicates that the calibration scan data for the marker 710 attached to the position of the vertex 721 is $(r_{s2}, \theta_{s2})$.

The marker position determination unit 602 calculates marker position coordinates in the scanner coordinate system based on the calibration scan data. As illustrated in 800b, the scanner coordinate system is a coordinate system in which the position of the laser scanner device 110 is the origin, the long side direction of the bed unit 152 is the $X_s$-axis, and the short side direction is the $Y_s$-axis. The marker position determination unit 602 calculates marker position coordinates $X_{s1}, Y_{s1}, X_{s2}, Y_{s2}$ based on the following expression.

$$X_{s1} = r_{s1} \times \cos \theta_{s1}$$

$$Y_{s1} = r_{s1} \times \sin \theta_{s1}$$

$$X_{s2} = r_{s2} \times \cos \theta_{s2}$$

$$Y_{s2} = r_{s2} \times \sin \theta_{s2}$$

(4) Specific Examples of Processing by Conversion Parameter Calculation Unit

Figure 9:
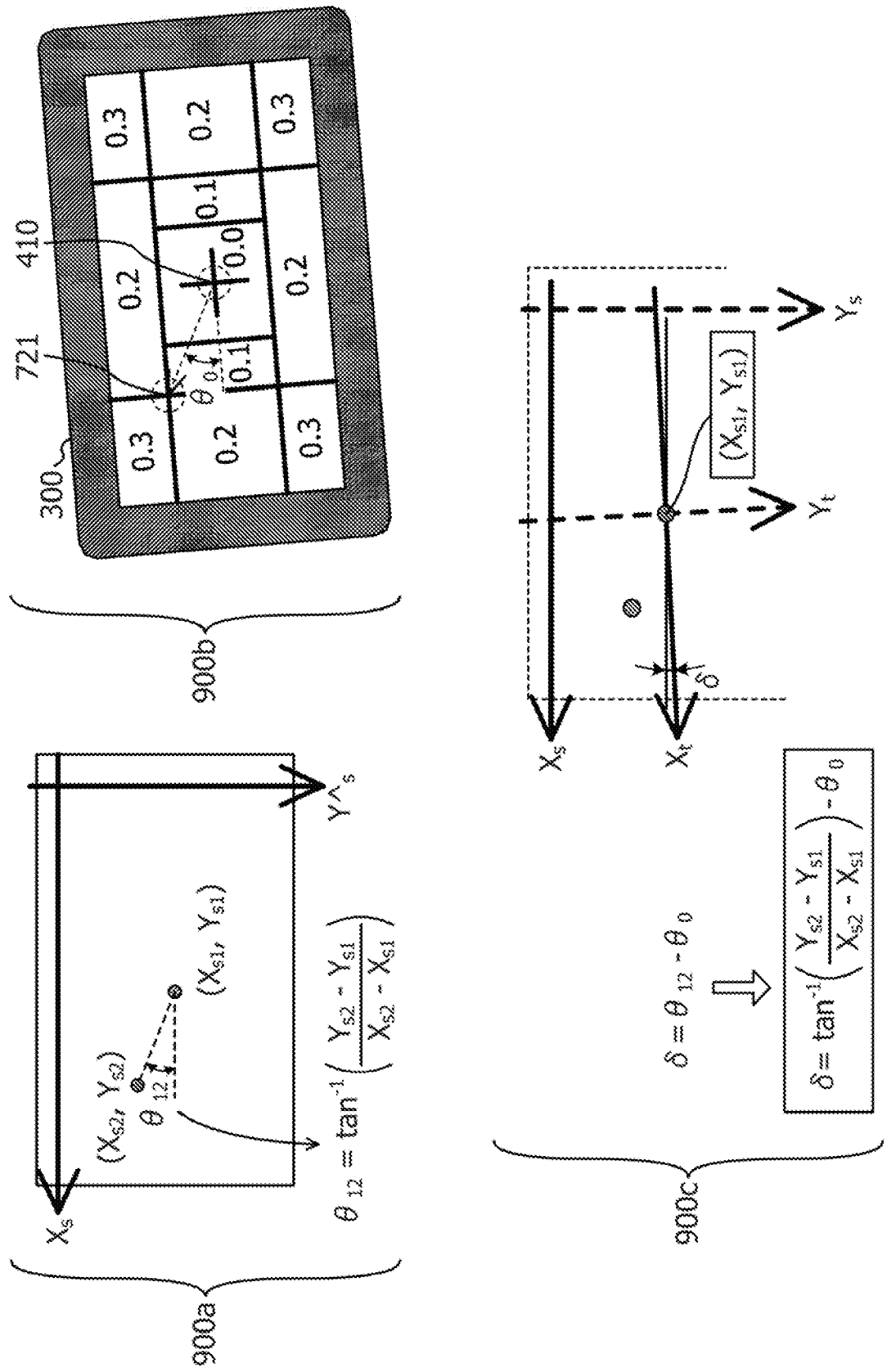
FIG. 9 is a view illustrating a specific example of processing by a conversion parameter calculation unit.

Next, a specific example of processing by the conversion parameter calculation unit 603 will be described. FIG. 9 is a view illustrating a specific example of processing by the conversion parameter calculation unit. Among these, part 900a illustrates that, based on marker position coordinates of the center position (the position of the origin 410) and marker position coordinates of the position of the vertex 721 calculated by the marker position determination unit 602, the positional relationship between the both is calculated.

As illustrated in 900a, the positional relationship between the center position (the position of the origin 410) and the position of the vertex 721 can be identified by, for example, how much the angle of the direction of the vertex 721 is deviated with respect to the $X_s$-axis direction of the scanner coordinate system when viewed from the center position (the position of the origin 410). Specifically, when the angle of the vertex 721 with respect to the $X_s$-axis direction when viewed from the center position (the position of the origin 410) is $\theta_{12}$, the angle can be calculated based on the following expression.

$$\theta_{12} = \tan^{-1}\left(\frac{Y_{s2} - Y_{s1}}{X_{s2} - X_{s1}}\right)$$

On the other hand, as indicated by 900b, in the region table 300, the positional relationship between the center position (the position of the origin 410) and the position of the vertex 721 is determined in advance. Thus, the conversion parameter calculation unit 603 reads the region table 300 and calculates the positional relationship (angle $\theta_0$) between the center position (the position of the origin 410) and the position of the vertex 721.

Then, the conversion parameter calculation unit 603 calculates the conversion parameters so that the following relationships coincide:
the positional relationship (angle $\theta_{12}$) between the center position (position of origin 410) and the position of the vertex 721, which is calculated based on the calibration scan data, and
the positional relationship (angle $\theta_0$) between the center position (position of origin 410) and the position of the vertex 721, which is calculated based on the region table 300.

Specifically, as illustrated in 900c, when a scanner coordinate plane is rotated so as to eliminate deviation of the angle of the vertex 721 in a state that the center position (position of the origin 410) coincides, a correction amount $\delta$ in a rotation direction around the origin 410 is calculated. Note that the correction amount $\delta$ can be calculated based on the following expression.

$$\delta = \theta_{12} - \theta_0$$

Thus, the correction amount $\delta$ is expressed using the scanner coordinate system as follows.

$$\delta = \tan^{-1}\left(\frac{Y_{s2} - Y_{s1}}{X_{s2} - X_{s1}}\right) - \theta_0$$

The conversion parameter calculation unit 603 stores the correction amount $\delta$ in the rotation direction around the origin 410 in the conversion parameter storage unit 141.

Here, as already described with FIG. 4, the score calculation unit 132 calculates the landing position of the competitor $(X_{tn}, Y_{tn})$ based on the trampoline coordinate system with the center position (origin 410) as the origin. For this reason, the conversion parameter calculation unit 603 calculates a correction amount based on the positional relationship between the long side direction and the short side direction of the bed unit 152 as a conversion parameter in addition to the correction amount $\delta$ in the rotation direction around the origin 410.

When the scanner coordinate system is converted into the trampoline coordinate system, the correction amount in the long side direction is nothing but the positional relationship (length) in the $X_s$-axis direction between the position of the laser scanner device 110 and the origin 410. Therefore, the conversion parameter calculation unit 603 stores $X_{s1}$ in the conversion parameter storage unit 141 as a correction amount in the long side direction when the scanner coordinate system is converted into the trampoline coordinate system.

Similarly, when the scanner coordinate system is converted into the trampoline coordinate system, the correction amount in the short side direction is nothing but the positional relationship (length) in the $Y_s$-axis direction between the position of the laser scanner device 110 and the origin 410. Therefore, the conversion parameter calculation unit 603 stores $Y_{s1}$ in the conversion parameter storage unit 141 as a correction amount in the short side direction when the scanner coordinate system is converted into the trampoline coordinate system.

(5) Flow of Calibration Process

Figure 10:
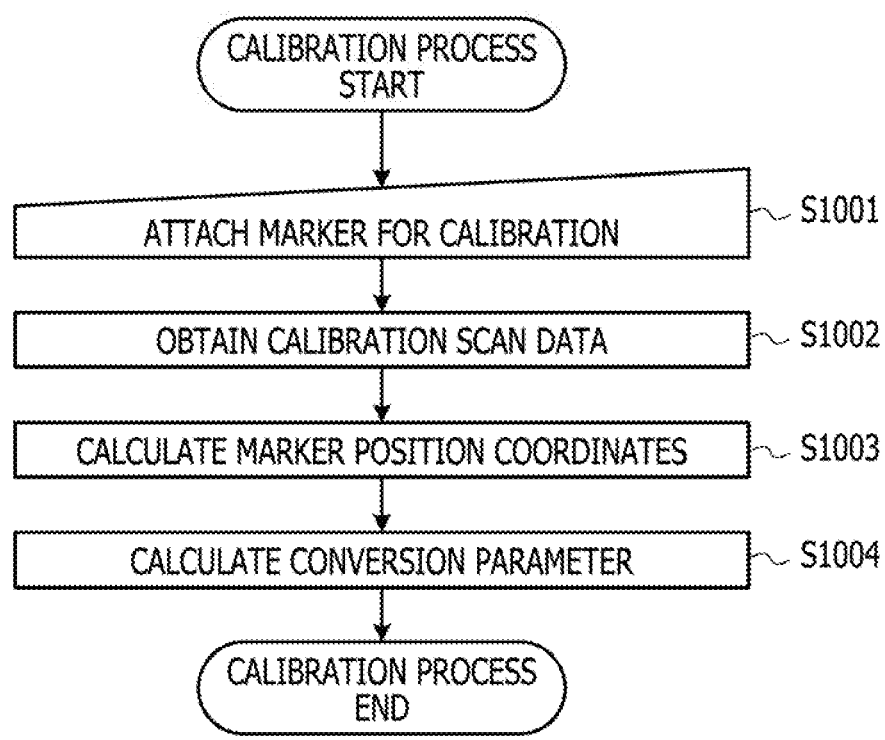
FIG. 10 is a diagram illustrating an example of a flowchart of a calibration process.

Next, a flow of a calibration process by the calibration unit 131 and the like will be described. FIG. 10 is a diagram illustrating an example of a flowchart of the calibration process. Before trampolining is started or when the measurement system 100 is installed, the calibration unit 131 and the like execute the calibration process illustrated in FIG. 10.

In step S1001, an administrator of the measurement system 100 sequentially attaches the markers 710 for calibration to predetermined two positions on the bed unit 152.

In step S1002, when the laser scanner device 110 starts scanning, the calibration scan data obtaining unit 601 obtains calibration scan data $(r_{s1}, \theta_{s1}, r_{s2}, \theta_{s2})$.

Specifically, the administrator of the measurement system 100 attaches the marker 710 for calibration to the center position of the bed unit 152, the laser scanner device 110 starts scanning, and thus the calibration scan data obtaining unit 601 obtains calibration scan data $(r_{s1}, \theta_{s1})$.

Subsequently, the administrator of the measurement system 100 attaches the marker 710 for calibration to the position of the vertex 721 of the bed unit 152, and the laser scanner device 110 starts scanning. Thus, the calibration scan data obtaining unit 601 obtains the calibration scan data $(r_{s2}, \theta_{s2})$.

In step S1003, the marker position determination unit 602 calculates marker position coordinates $(X_{s1}, Y_{s1}, X_{s2}, Y_{s2})$ based on the calibration scan data.

In step S1004, the conversion parameter calculation unit 603 refers to the region table 300 in the table storage unit 142 to calculate the correction amount δ in the rotation direction around the origin 410. Then, the conversion parameter calculation unit 603 stores the correction amount δ in the rotation direction together with the correction amount in the long side direction $(X_{s1})$ and the correction amount in the short side direction $(Y_{s1})$ as conversion parameters $(\delta, X_{s1}, Y_{s1})$ in the conversion parameter storage unit 141.

<Functional Configuration (Score Calculation Unit) of Data Processing Apparatus>

Next, details of a functional configuration of the score calculation unit 132 among functional configurations of the data processing apparatus 120 will be described.

(1) Details of Functional Configuration of Score Calculation Unit

Figure 11:
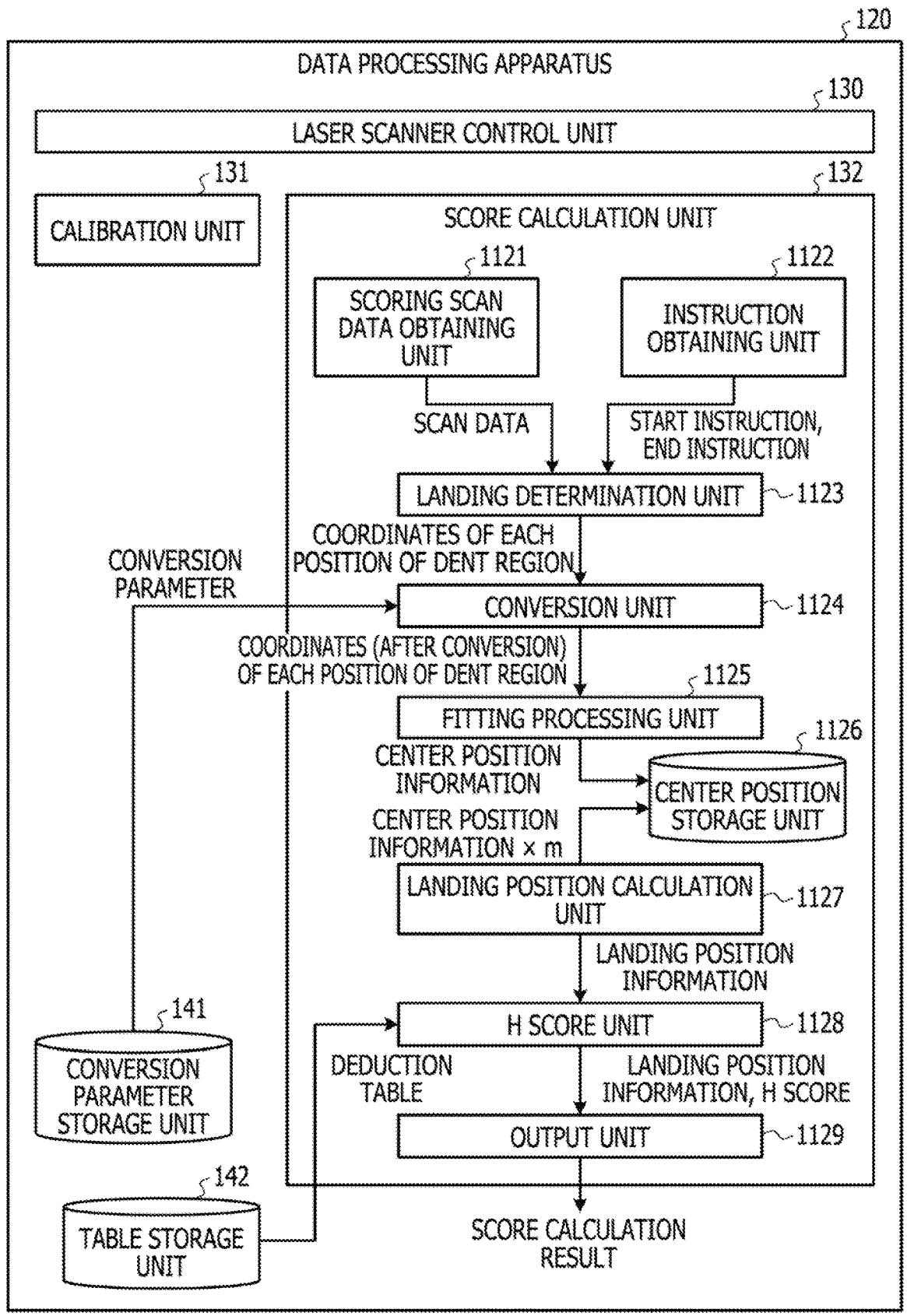
FIG. 11 is a diagram illustrating an example of a functional configuration of a score calculation unit of the data processing apparatus.

FIG. 11 is a diagram illustrating an example of a functional configuration of the score calculation unit of the data processing apparatus. As illustrated in FIG. 11, the score calculation unit 132 has a scoring scan data obtaining unit 1121, an instruction obtaining unit 1122, a landing determination unit 1123, a conversion unit 1124, a fitting processing unit 1125, a landing position calculation unit 1127, an H score unit 1128, and an output unit 1129.

The scoring scan data obtaining unit 1121 obtains scoring scan data (hereinafter simply referred to as scan data) transmitted from the laser scanner device 110 and notifies the landing determination unit 1123 of the scoring scan data. As described above, the scan data includes distance information indicating the distance from the laser scanner device 110 to a dent region of the bed unit 152 and angle information indicating the direction of the dent region of the bed unit 152 when viewed from the laser scanner device 110.

Note that for scan data scanned in a state that no dent region is generated in the bed unit 152 among scan data obtained by the scoring scan data obtaining unit 1121, it is assumed that a predetermined default value is stored in the distance information. This is because, in a case where no dent region is generated in the bed unit 152, the laser scanner device 110 cannot receive a reflected light and is unable to perform distance measurement, and thus the laser scanner device 110 stores a default value in distance information and transmits the distance information.

For a similar reason, for distance information included in scan data obtained by the scoring scan data obtaining unit 1121, a default value is stored in distance information based on laser light emitted toward a region other than a dent region generated in the bed unit 152.

The instruction obtaining unit 1122 obtains a measurement start instruction and a measurement end instruction which are input by the administrator or the like of the measurement system 100. The instruction obtaining unit 1122 notifies the landing determination unit 1123 of the obtained measurement start instruction and measurement end instruction.

When the landing determination unit 1123 receives the measurement start instruction from the instruction obtaining unit 1122, the landing determination unit 1123 starts processing of the scan data notified from the scoring scan data obtaining unit 1121. Specifically, the landing determination unit 1123 converts the scan data into coordinates of the scanner coordinate system. Further, the landing determination unit 1123 determines whether the competitor of the trampolining has landed on the bed unit 152 or not (whether the competitor has changed to a non-jumping state or not) based on whether the converted coordinates are included in the bed unit 152 or not.

Moreover, when the landing determination unit 1123 determines that the competitor of the trampolining has changed to a non-jumping state, the landing determination unit 1123 thereafter notifies the conversion unit 1124 of coordinates indicating each position of a dent region (which are limited to coordinates indicating a position in the bed unit 152) until it is determined that the competitor has changed to a jumping state.

These processes by the landing determination unit 1123 are continued until the landing determination unit 1123 receives a measurement end instruction from the instruction obtaining unit 1122.

The conversion unit 1124 reads the conversion parameter from the conversion parameter storage unit 141, and converts the coordinates (coordinates of the scanner coordinate system) indicating each position of the dent region notified from the landing determination unit 1123 into the trampoline coordinate system. Then, the conversion unit 1124 notifies the fitting processing unit 1125 of the coordinates (after conversion) indicating each position of the dent region.

The fitting processing unit 1125 plots the coordinates (after conversion) indicating each position of the dent region notified by the conversion unit 1124 on a trampoline coordinate plane, and fits a circular shape to the plotted position. As a fitting method performed by the fitting processing unit 1125, an arbitrary method such as a method using a least square method or a method using the Hough transform can be applied.

Note that the circular shape obtained by fitting is equal to a cross-sectional shape of when the dent region is cut by a plane approximately parallel to the bed unit 152. Here, assuming that a dent region generated when the competitor lands on the bed unit 152 has an even shape centered on the landing position, the center position of a circular shape obtained by fitting can be said to represent the landing position of the competitor.

Accordingly, the fitting processing unit 1125 calculates the center position of the circular shape obtained by fitting, and stores coordinates of the calculated center position in a center position storage unit 1126 as center position information of the competitor.

Here, it is assumed that the laser scanner device 110 performs scanning multiple times (for example, scanning m times) while the competitor is in a non-jumping state. In this case, the fitting processing unit 1125 stores m pieces of center position information in the center position storage unit 1126. Note that the "while the competitor is in a non-jumping state" refers to a time from when it is determined that the competitor has changed to the non-jumping state to when it is determined that the competitor has changed to a jumping state.

The landing position calculation unit 1127 reads m pieces of center position information stored in the center position storage unit 1126 and calculates average position coordinates, thereby calculating coordinates indicating a landing position. The landing position calculation unit 1127 notifies the H score unit 1128 of the calculated coordinates indicating the landing position as landing position information.

The H score unit 1128 reads the deduction table 430 stored in the calculation table storage unit 142 and compares the deduction table 430 with the landing position information notified by the landing position calculation unit 1127, thereby identifying the H score of the competitor. Further, the H score unit 1128 notifies the output unit 1129 of the specified H score together with the landing position information.

The output unit 1129 displays, on the display unit 505, the landing position information and the H score notified by the H score unit 1128 as a score calculation result.

(2) Specific Example of Scan Data

Figure 12:
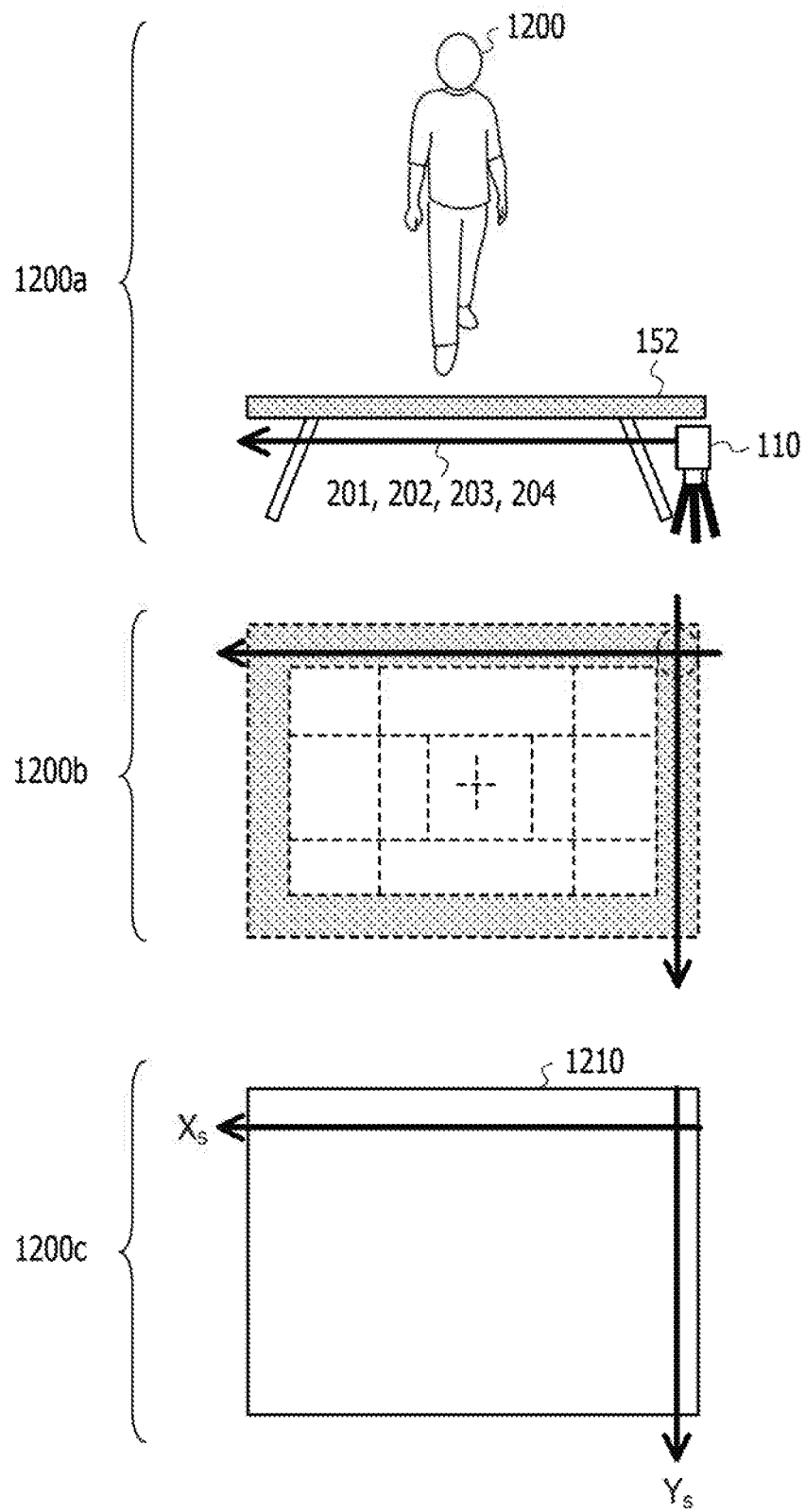
FIG. 12 is a view illustrating an example of scan data in a case where a competitor is in a jumping state.

Next, a specific example of scan data will be described in association with each state of a competitor during trampolining. FIG. 12 is a view illustrating an example of the scan data in a case where the competitor is in a jumping state.

As illustrated in 1200*a* in FIG. 12, in a case where a competitor 1200 is in a jumping state, no dent region is generated in the bed unit 152. Accordingly, laser lights 201 to 204 emitted by the laser scanner device 110 are not reflected on the bed unit 152 (1200*b* in FIG. 12), and a default value is stored in distance information included in scan data. In this case, nothing is plotted on a scanner coordinate plane 1210, as illustrated in 1200*c* in FIG. 12.

Figure 13:
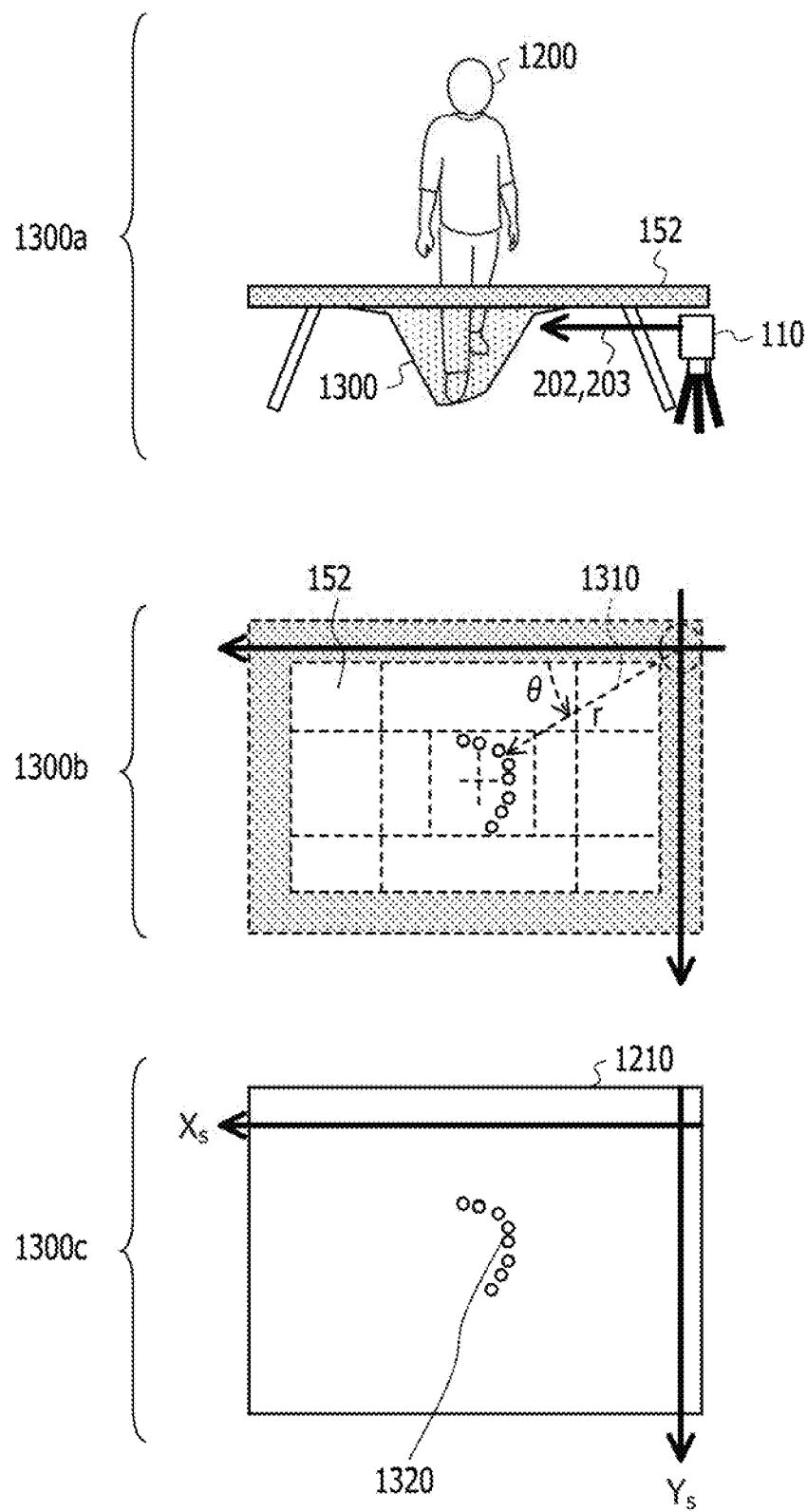
FIG. 13 is a view illustrating an example of scan data in a case where the competitor is in a non-jumping state.

Meanwhile, FIG. 13 is a view illustrating an example of scan data in a case where the competitor is in a non-jumping state. As illustrated in 1300*a* in FIG. 13, in a case where the competitor 1200 is in a non-jumping state, a dent region 1300 is generated in the bed unit 152. Thus, a laser light 202, for example, out of laser lights 201 to 204 emitted by the laser scanner device 110, is reflected on the dent region in the bed unit 152. Therefore, scan data including distance information (r) indicating the distance to a dent region and angle information (θ) indicating the direction of the dent region is transmitted to the data processing apparatus 120 (see scan data 1310 and the like in 1300*b* in FIG. 13).

In this case, as illustrated in 1300*c* in FIG. 13, the landing determination unit 1123 converts the scan data (for example, the scan data 1310) into the scanner coordinate system. Note that the example in 1300*c* in FIG. 13 illustrates that eight data items of the scan data including distance information indicating the distance to the dent region and angle information indicating the direction of the dent region are obtained in one time of scanning. For this reason, eight points including the point 1320 are plotted on the scanner coordinate plane 1210 as the coordinates of each position of the dent region.

(3) Specific Examples of Processing by Conversion Unit

Next, a specific example of processing by the conversion unit 1124 will be described. FIG. 14 is a view illustrating a specific example of processing by the conversion unit. The conversion unit 1124 converts scan data converted into the scanner coordinate system into the trampoline coordinate system using conversion parameters.

Part 1400*a* illustrates the trampoline coordinate system superimposed on the scanner coordinate system. The conversion unit 1124 converts eight points on the scanner coordinate plane 1210 plotted as coordinates of respective positions of a dent region into the trampoline coordinate system using conversion parameters (δ, $X_{s1}$, $Y_{s1}$) according to the following expression.

$$\begin{pmatrix} X_{tn} \\ Y_{tn} \end{pmatrix} = \begin{pmatrix} \cos\delta & -\sin\delta \\ \sin\delta & \cos\delta \end{pmatrix} \begin{pmatrix} X_{sn} - X_{s1} \\ Y_{sn} - Y_{s1} \end{pmatrix}$$

Note that in the above expression, the coordinates of eight points on the scanner coordinate plane 1210 are sequentially substituted into ($X_{sn}$, $Y_{sn}$). As illustrated in 1400*b*, the eight points on the scanner coordinate plane 1210 are sequentially substituted into the above expression, thereby converting the eight points on the scanner coordinate plane 1210 into the trampoline coordinate system. Part 1400*c* illustrates a state that the eight points converted into the trampoline coordinate system are plotted on a trampoline coordinate plane 1410.

(4) Specific Example of Fitted Circular Shape

Next, a specific example of a circular shape fitted by the fitting processing unit 1125 will be described. FIG. 15 is a view illustrating a specific example of a fitted circular shape. Among these, part 1500*a* in FIG. 15 illustrates an approximated curve 1500 obtained by approximating eight points plotted on the trampoline coordinate plane 1410.

Here, the fitting processing unit 1125 calculates a circular shape that minimizes the sum of squares of residuals from the approximated curve 1500. In 1500*b* in FIG. 15, a circular shape 1510 depicts the circular shape that minimizes the sum of squares of the residuals from the approximated curve 1500, and a point 1520 depicts a center position of the circular shape 1510. Coordinates of the point 1520 on the trampoline coordinate plane 1410 are stored in the center position storage unit 1126 as center position information.

(5) Specific Example of Landing Position Information

Figure 16:
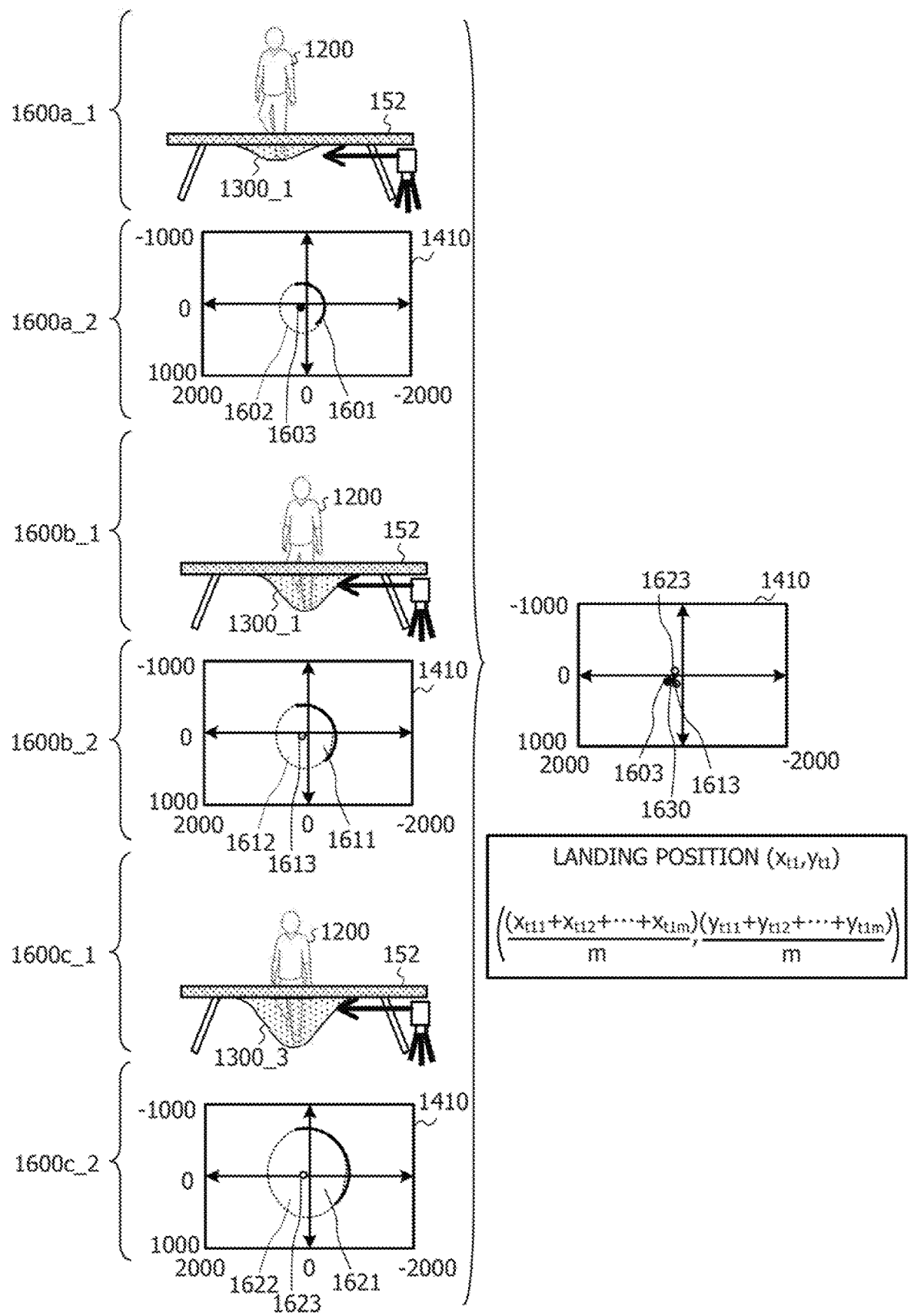
FIG. 16 is a view illustrating a specific example of landing position information.

Next, a specific example of the landing position information calculated by the landing position calculation unit 1127 will be described. FIG. 16 is a view illustrating a specific example of the landing position information. Among these, parts 1600*a*_1, 1600*b*_1, 1600*c*_1 in FIG. 16 respectively illustrate states of the competitor 1200 in a non-jumping state.

Specifically, part 1600*a*_1 in FIG. 16 illustrates a state immediately after the competitor 1200 has changed to a non-jumping state, and the amount of dent in a dent region 1300_1 is small. On the other hand, part 1600*b*_1 in FIG. 16 illustrates a state after the amount of dent in the dent region becomes larger than the state immediately after changing to the non-jumping state (size of dent region 1300_2>size of dent region 1300_1). Moreover, part 1600*c*_1 in FIG. 16 illustrates a state when the dent region becomes maximum (size of dent region 1300_3>size of dent region 1300_2).

Parts 1600*a*_2, 1600*b*_2, and 1600*c*_2 in FIG. 16 illustrate states that center position information is calculated by scanning in the respective non-jumping states.

For example, center position information of 1600*a*_2 in FIG. 16 is calculated by the following procedure. First, the conversion unit 1124 converts scan data (scanner coordinate system) obtained in the non-jumping state indicated by 1600*a*_1 in FIG. 16 into the trampoline coordinate system. Subsequently, the fitting processing unit 1125 approximates points plotted on the trampoline coordinate plane 1410 to obtain an approximated curve 1601. Thereafter, the fitting processing unit 1125 calculates a circular shape 1602 that minimizes the sum of squares of residuals from the approximated curve 1601. In this manner, as indicated by 1600*a*_2, a center position 1603 of the circular shape 1602 is calculated.

Similarly, center position information of 1600*b*_2 in FIG. 16 is calculated by the following procedure. First, the conversion unit 1124 converts scan data (scanner coordinate system) obtained in the non-jumping state indicated by 1600b_1 in FIG. 16 into the trampoline coordinate system. Subsequently, the fitting processing unit 1125 approximates points plotted on the trampoline coordinate plane 1410 to obtain an approximated curve 1611. Thereafter, the fitting processing unit 1125 calculates a circular shape 1612 that minimizes the sum of squares of residuals from the approximated curve 1611. In this manner, as indicated by 1600b_2, a center position 1613 of the circular shape 1612 is calculated.

Similarly, center position information of 1600c_2 in FIG. 16 is calculated by the following procedure. First, the conversion unit 1124 converts scan data (scanner coordinate system) obtained in the non-jumping state indicated by 1600c_1 in FIG. 16 into the trampoline coordinate system. Subsequently, the fitting processing unit 1125 approximates points plotted on the trampoline coordinate plane 1410 to obtain an approximated curve 1621. Thereafter, the fitting processing unit 1125 calculates a circular shape 1622 that minimizes the sum of squares of residuals from the approximated curve 1621. In this manner, as indicated by 1600c_2, a center position 1623 of the circular shape 1622 is calculated.

The landing position calculation unit 1127 calculates coordinates (average position coordinates) of an average position 1630 of the center positions 1603, 1613, 1623, . . . calculated by scanning in respective non-jumping states to calculate coordinates indicating the landing position.

Here, coordinates of the center position 1603 are ($X_{t11}$, $Y_{t11}$), coordinates of the center position 1613 are ($X_{t12}$, $Y_{t12}$), coordinates of the center position 1623 are ($X_{t13}$, $Y_{t13}$), and coordinates of the center position calculated based on m-th scanning are ($X_{t1m}$, $Y_{t1m}$). In this case, coordinates ($X_{t1}$, $Y_{t1}$) indicating the landing position during a first change to a non-jumping state, which are calculated by m times of scanning, can be calculated by the following expression.

$$(X_{t1}, Y_{t1}) = \left( \frac{(X_{t11} + X_{t12} + \ldots + X_{t1m})}{m}, \frac{(Y_{t11} + Y_{t12} + \ldots + Y_{t1m})}{m} \right)$$

(6) Flow of Landing Position Measuring Process

Figure 17:
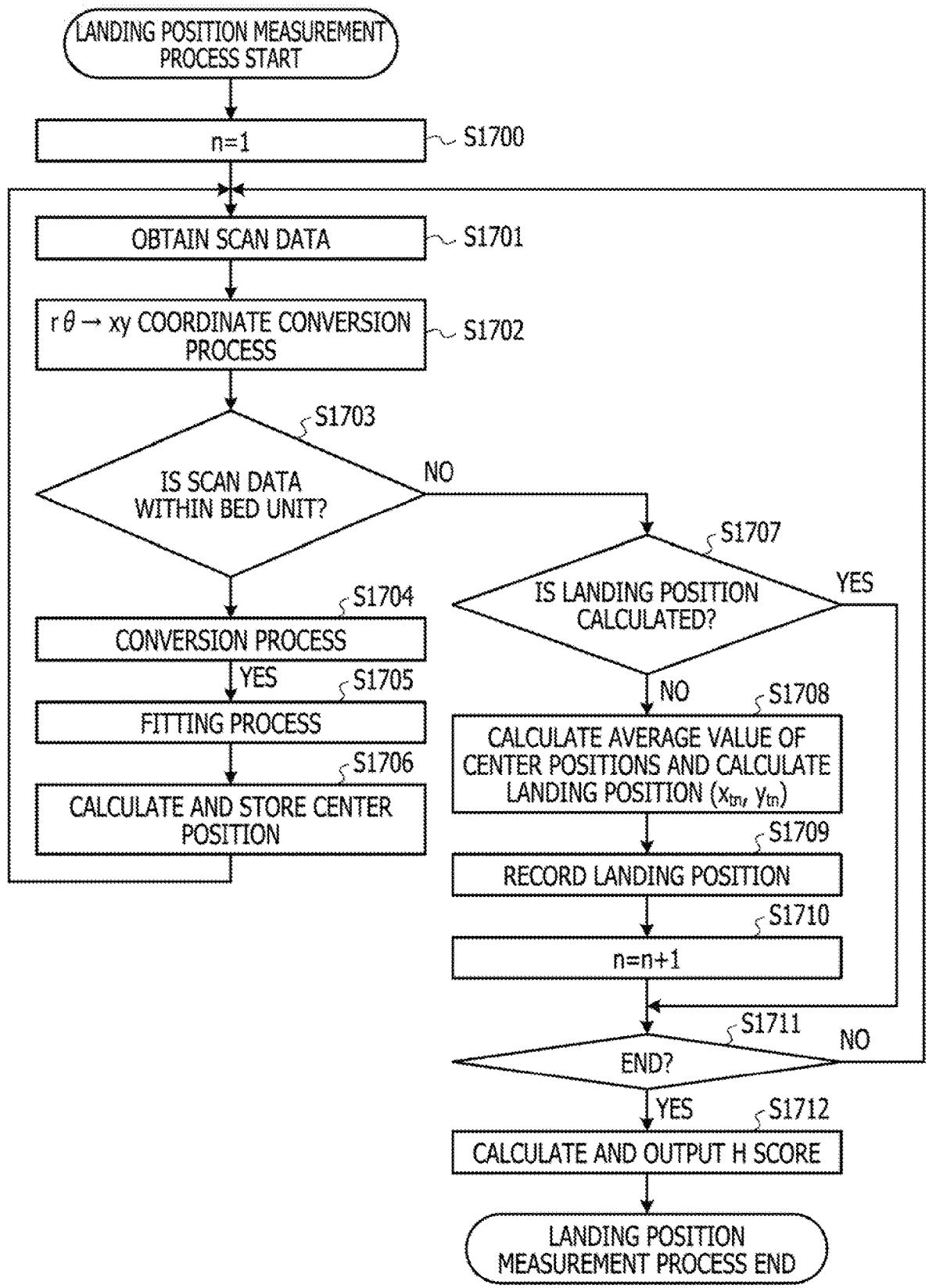
FIG. 17 is a flowchart illustrating a flow of a landing position measuring process.

Next, a flow of a landing position measuring process in the score calculation unit 132 will be described. FIG. 17 is a flowchart illustrating a flow of a landing position measuring process. When a measurement start instruction is received from the instruction obtaining unit 1122, a landing position measuring process illustrated in FIG. 17 is executed.

In step S1700, the landing determination unit 1123 substitutes 1 for the number of changes to a non-jumping state (n).

In step S1701, the landing determination unit 1123 obtains scan data notified by the scoring scan data obtaining unit 1121.

In step S1702, the landing determination unit 1123 converts distance information (r) and angle information (θ) included in each item of the obtained scan data for one time of scanning into the scanner coordinate system (rθ→xy).

In step S1703, the landing determination unit 1123 determines whether each item of the scan data for one time of scanning that is converted into the scanner coordinate system is included in the bed unit 152 or not. When it is determined that each item of the scan data is included in the bed unit 152 in step S1703 (when Yes in step S1703), the process proceeds to step S1704.

In step S1704, the conversion unit 1124 converts each item of the scan data for one time of scanning converted into the scanner coordinate system into the trampoline coordinate system by using the conversion parameters.

In step S1705, the fitting processing unit 1125 calculates an approximated curve of the scan data for one time of scanning converted into the trampoline coordinate system, and fits a circular shape.

In step S1706, the fitting processing unit 1125 calculates a center position of the fitted circular shape and stores the center position in the center position storage unit 1126 as center position information.

On the other hand, when it is determined that each item of the scan data is not included in the bed unit 152 in step S1703 (when No in step S1703), the process proceeds to step S1707.

In step S1707, the landing position calculation unit 1127 determines whether the coordinates indicating the landing position have been calculated or not based on the center position information stored in the center position storage unit 1126. When it is determined that the coordinates indicating the landing position have not been calculated in step S1707, the process proceeds to step S1708.

In step S1708, the landing position calculation unit 1127 calculates average position coordinates based on the center position information to thereby calculate landing position coordinates ($X_{tn}$, $Y_{tn}$) indicating the landing position during the n-th change to the non-jumping state.

In step S1709, the landing position calculation unit 1127 records, in a score calculation result, landing position coordinates ($X_{tn}$, $Y_{tn}$) during the n-th change to the non-jumping state as landing position information.

In step S1710, the landing position calculation unit 1127 increments the number (n) of changes to the non-jumping state.

In step S1711, the landing determination unit 1123 determines whether an end instruction from the instruction obtaining unit 1122 has been received or not. When it is determined that the end instruction has not been received from the instruction obtaining unit 1122 in step S1711, the process returns to step S1701.

On the other hand, in the case of determining that the end instruction has been received from the instruction obtaining unit 1122 in step S1711, the process proceeds to step S1712. In step S1712, the H score unit 1128 specifies an H score according to the landing position information of each time by referring to the deduction table 430 of H score, and outputs a score calculation result including the landing position information and the H score.

(7) Specific Example of Score Calculation Result

Next, a specific example of a score calculation result output from the output unit 1129 will be described. FIG. 18 is a table illustrating a specific example of the score calculation result. As illustrated in FIG. 18, a score calculation result 1800 includes "ID" for identifying the competitor, "non-jumping state change", "landing position", and "H score" as items of information.

In the "ID", an identifier for identifying each competitor is stored. In the "non-jumping state change", the number (n) of changes to the non-jumping state in which the competitor 1200 has changed to a non-jumping state in trampolining is stored. In the "landing position", the landing position information calculated using the scan data obtained by m times of scanning by the laser scanner device 110 while the competitor 1200 is in a non-jumping state is stored.

In the "H score", the H score of each time specified by comparing the landing position information stored in the corresponding "landing position" with the deduction table 430 of H score is stored.

As is apparent from the above description, in the measurement system according to the first embodiment, the laser scanner device that scans a direction approximately parallel to the bed unit with a laser light is disposed below the bed unit of a trampoline. Then, scan data for calibration is obtained by measuring positions of markers attached to two predetermined positions of the bed unit, and coordinates of the markers in the scanner coordinate system with the position of the laser scanner device being an origin are calculated. Moreover, based on the relationship between calculated marker coordinates and corresponding two positions of the bed unit, there are calculated conversion parameters for converting coordinates of each position in the scanner coordinate system into coordinates of respective positions of the trampoline coordinate system with the center position of the bed unit being an origin.

Thus, with the measurement system according to the first embodiment, the conversion parameters for clarifying the positional relationship between the scan data measured by the laser scanner device and the bed unit of the trampoline can be calculated.

Further, the measurement system according to the first embodiment converts scan data obtained from the laser scanner device into the trampoline coordinate system using the conversion parameters during trampolining. Furthermore, the measurement system according to the first embodiment calculates the shape of a cross section (fitted circular shape) of a dent region based on scan data converted into the trampoline coordinate system, and calculates a landing position of the competitor on the bed unit based on a center position of the cross section.

Thus, in the measurement system according to the first embodiment, it is possible to determine which of regions divided by a plurality of scoring lines corresponds to a landing position calculated based on the scan data. As a result, with the measurement system according to the first embodiment, it is possible to identify the H score of the competitor.

Thus, with the measurement system according to the first embodiment, a calibration method for achieving scoring according to a landing position can be provided.

Second Embodiment

In the first embodiment described above, the coordinate table 420 used for calculating the H score is generated based on dimensions defined on the region table 300. On the other hand, in a second embodiment, a marker is attached to each intersection position of a plurality of scoring lines on the bed unit, and scanning is performed to obtain coordinates of each intersection position in the trampoline coordinate system. Then, in the second embodiment, a coordinate table is generated based on the obtained coordinates of each intersection position. Hereinafter, the second embodiment described above will be described focusing on differences from the first embodiment.

<Attachment Positions of Markers for Generating Coordinate Table>

Figure 19:
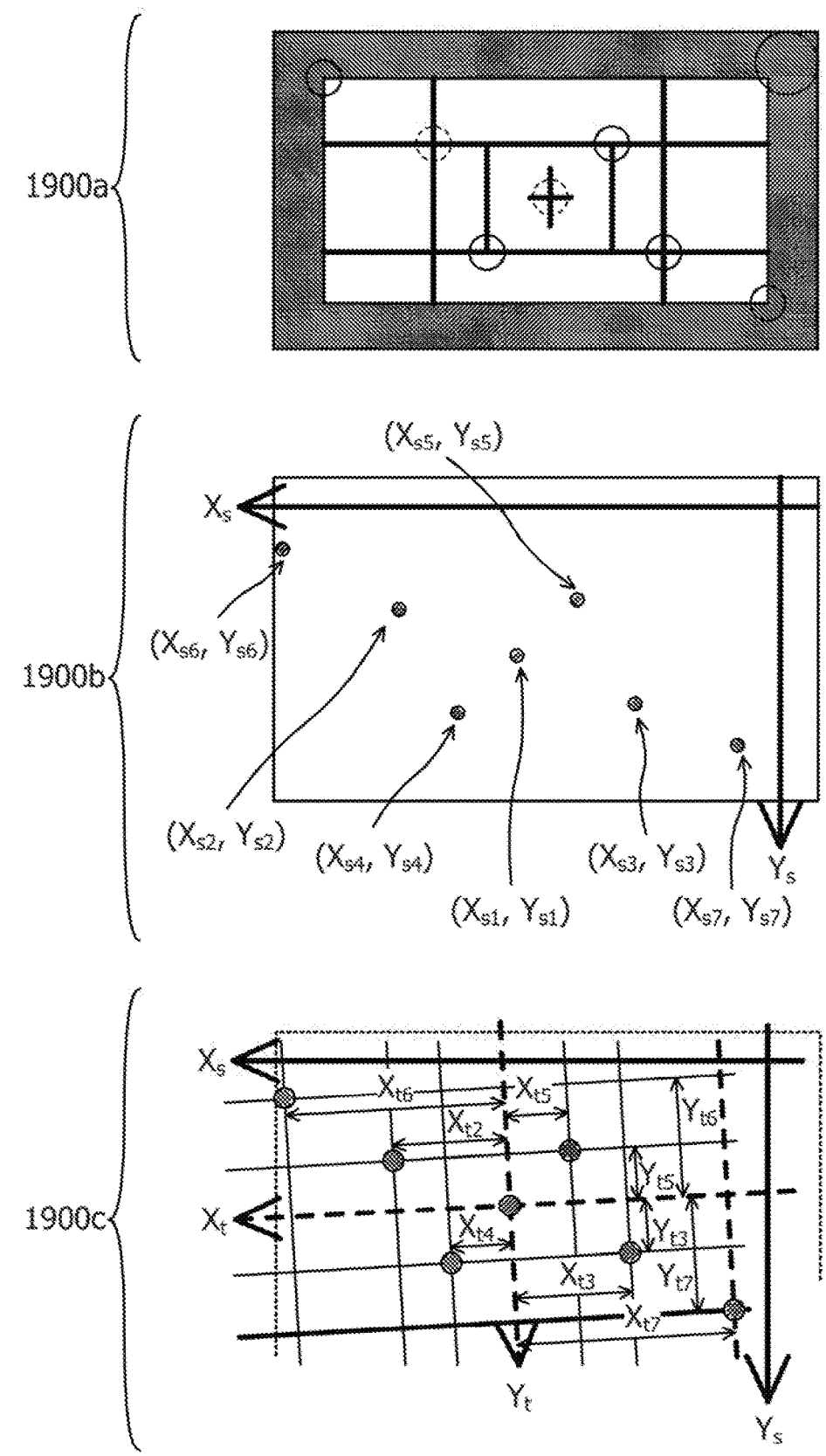
FIG. 19 is a first view for explaining attachment positions of markers.

First, attachment positions of markers for generating a coordinate table will be described. FIG. 19 is a first view for explaining attachment positions of markers. Among these, part 1900*a* illustrates a top view when the attachment positions of markers are viewed from above the bed unit 152. As illustrated in 1900*a*, the markers are attached at positions (one center position and six intersection positions) necessary for specifying respective regions of the bed unit 152.

Part 1900*b* illustrates that scan data obtained by scanning the markers attached to the bed unit 152 is converted into the scanner coordinate system.

Part 1900*c* illustrates how coordinates of the six intersection positions in the trampoline coordinate system are calculated by converting coordinates of the one center position and the six intersection positions in the scanner coordinate system into the trampoline coordinate system.

In this manner, by calculating the coordinates of the one center position and the six intersection positions, a dimension in an $X_t$-axis direction and a dimension in a $Y_t$-axis direction to a boundary point of each region in the region table 300 can be identified to generate a coordinate table.

<Specific Example of Coordinate Table>

Figure 20:
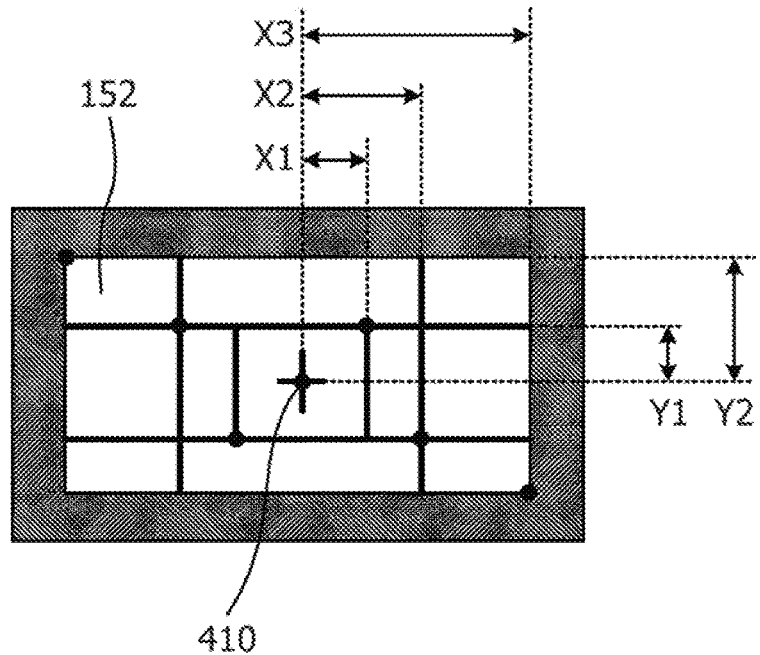
FIG. 20 is a first view illustrating a specific example of a coordinate table.

FIG. 20 is a first view illustrating a specific example of a coordinate table. As illustrated in a coordinate table 2020 of FIG. 20, the dimensions X1 to X3, Y1, and Y2 can be calculated based on the coordinates of one center position and six intersection positions.

In this manner, with the measurement system 100 according to the second embodiment, a coordinate table can be generated based on actually measured values by scanning with the markers attached to the one center position and the six intersection positions.

Third Embodiment

In the second embodiment described above, the coordinate table 2020 is generated by scanning with the markers attached to one center position and six intersection positions. On the other hand, in a third embodiment, a coordinate table is generated by scanning with markers attached to one center position and three intersection positions. Hereinafter, the third embodiment will be described focusing on differences from the second embodiment described above.

<Attachment Positions of Markers for Calculating Coordinate Table>

Figure 21:
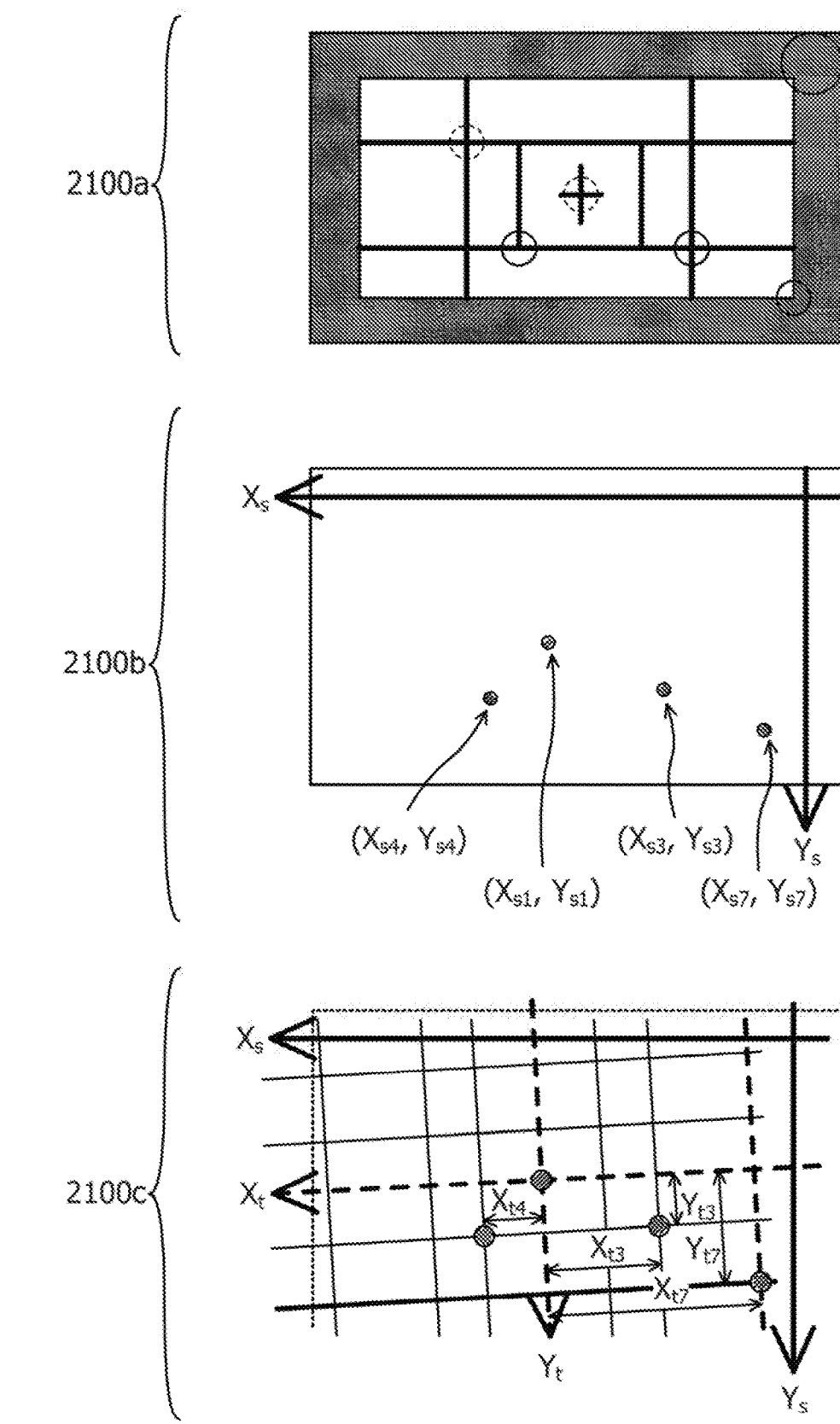
FIG. 21 is a second view for explaining attachment positions of markers.

First, attachment positions of markers for calculating a coordinate table will be described. FIG. 21 is a second view for explaining attachment positions of markers. Among these, part 2100*a* illustrates a top view when the attachment positions of markers are viewed from above the bed unit 152. As indicated by 2100*a*, the markers are attached to positions (one center position and three intersection positions) necessary for specifying respective regions of the bed unit 152.

Part 2100*b* illustrates that scan data obtained by scanning the markers attached to the bed unit 152 is converted into the scanner coordinate system.

Part 2100*c* illustrates how coordinates of the three intersection positions in the trampoline coordinate system are calculated by converting the coordinates of the one center position and the three intersection positions in the scanner coordinate system into the trampoline coordinate system.

In this manner, by calculating the coordinates of the one center position and the three intersection positions, a dimension in an $X_t$-axis direction and a dimension in a $Y_t$-axis direction to a boundary point of each region in the region table 300 can be identified to generate a coordinate table.

<Specific Example of Coordinate Table>

Figure 22:
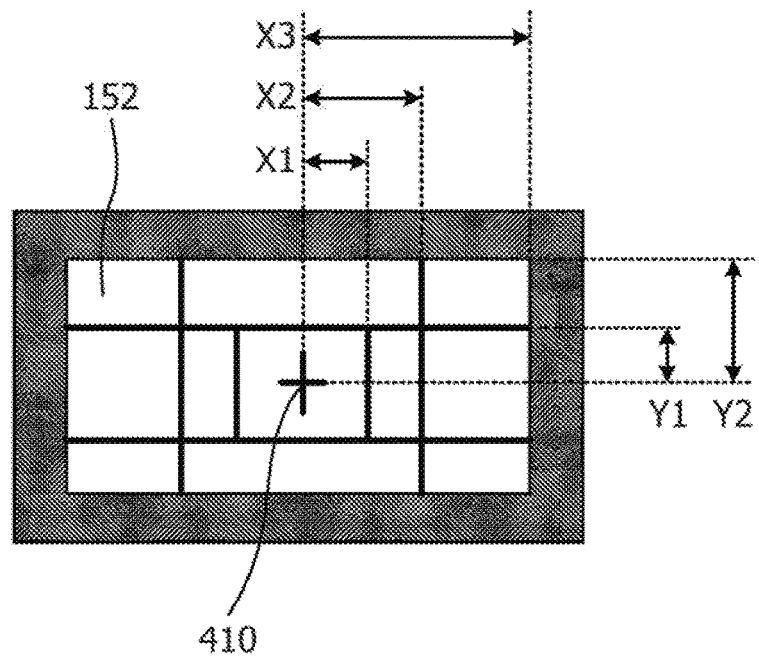
FIG. 22 is a second view illustrating a specific example of a coordinate table.

FIG. 22 is a second view illustrating a specific example of a coordinate table. As illustrated in a coordinate table 2220 of FIG. 22, the dimensions X1 to X3, Y1, Y2 can be calculated based on the coordinates of one center position and three intersection positions.

Thus, with the measurement system 100 according to the third embodiment, a coordinate table can be generated based on actually measured values by scanning with the markers attached to the one center position and the three intersection positions.

Other Embodiments

Figure 23:
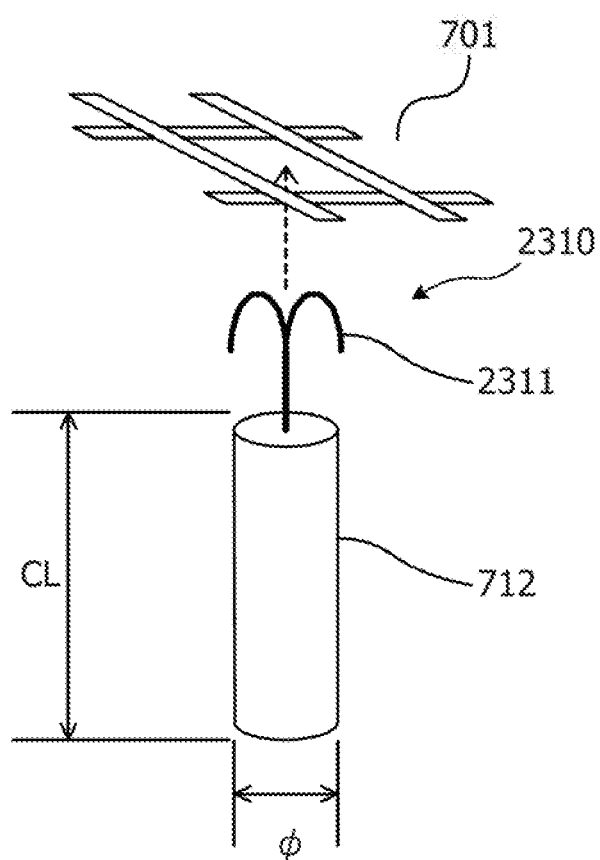
FIG. 23 is a view illustrating an example of an exterior appearance configuration of another marker.

In the first embodiment described above, one type of shape is exemplified as the shape of the marker (see 700a in FIG. 7), but the shape of the marker is not limited to this. FIG. 23 is a view illustrating an example of an exterior appearance configuration of another marker. As illustrated in FIG. 23, a marker 2310 has a hook portion 2311 that has two engaging members. Thus, by having two engaging members, when attaching the marker 2310 to a predetermined position of the bed unit 152, the marker can be engaged with the bed unit 152 at two positions.

Further, in the description of the first embodiment described above, the marker is attached to the bed unit 152 by suspending. However, the marker may be placed on the floor surface below the bed unit 152.

Further, in the description of the first embodiment described above, the process of converting scan data converted into the scanner coordinate system into the trampoline coordinate system by using the conversion parameters is executed after the process by the landing determination unit 1123 is completed.

However, the order of the process to convert into the trampoline coordinate system is not limited to this. For example, the order may be after landing position information is calculated by the landing position calculation unit 1127. Alternatively, the order may be before scan data is input to the landing determination unit 1123.

Further, in the first embodiment described above, when attaching the markers, the center position of the bed unit 152 and a plurality of intersection positions of lines are selected, but the attachment positions of markers are not limited thereto.

For example, a position other than the center position of the bed unit 152 may be selected. Alternatively, positions other than the plurality of intersection positions of lines may be selected. That is, as long as it is a position that can be specified on the bed unit 152, any position may be selected to attach the marker.

Further, in the description of the first embodiment described above, the markers are attached to two predetermined locations of the bed unit 152, but the markers may be attached to three or more positions. This is because conversion parameters can be calculated by attaching markers to at least two positions, but by attaching markers to three or more positions, improvement in calculation accuracy of conversion parameters can be expected.

Further, in the description of the first embodiment described above, every time one marker is attached to one place, the marker is scanned with a laser light. However, the scanning method of markers is not limited to this. A plurality of markers may be prepared and attached to a plurality of positions simultaneously, and calibration scan data may be obtained for the plurality of markers by one time of scanning with a laser beam. However, in this case, it is assumed that the correspondence between each of multiple items of calibration scan data and the attachment position of each marker is clarified.

Note that the present invention is not limited to the configurations described here, and may include combinations of the configurations or the like described in the embodiments described above with other elements, and the like. These points can be changed within a range not departing from the spirit of the present invention, and can be appropriately determined according to application modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A calibration method of calibrating a conversion parameter, the calibration method being a method implemented by a computer, the method comprising:
   measuring, with a laser ranging sensor, markers attached to at least two predetermined positions of a bed portion of a trampoline and calculating coordinates of the markers in a first coordinate system with a position of the laser ranging sensor being an origin;
   adjusting, based on a relationship between the calculated coordinates of the markers and the at least two predetermined positions of the bed portion, the conversion parameter to be used for converting coordinates of respective positions of the first coordinate system into coordinates of respective positions of a second coordinate system with a center position of the bed portion being an origin;
   storing the adjusted conversion parameter in a memory, to use the adjusted conversion parameter stored in the memory to convert a measured position from the first coordinate system into the second coordinate system.

2. The calibration method according to claim 1, wherein at least two predetermined positions of the bed unit include the center position of the bed portion.

3. The calibration method according to claim 1, wherein the markers each have a hook shape to be suspended from the bed unit.

4. The calibration method according to claim 1, wherein when a distance from the laser ranging sensor at a position where the distance from the laser ranging sensor is maximum, and where it is possible to suspend the marker, is L, and an angular resolution of the laser ranging sensor at the position where the distance from the laser ranging sensor is maximum is $\Theta$, a diameter $\varphi$ of the marker satisfies $\varphi \geq 2 \times L \times \sin \Theta$.

5. The calibration method according to claim 1, wherein by measuring markers attached to the predetermined six intersections among intersections of a plurality of lines dividing the bed portion and to the center position of the bed portion with the laser ranging sensor, coordinates for identifying dimensions to boundary points of respective regions divided by the plurality of lines are calculated.

6. The calibration method according to claim 1, wherein by measuring markers attached to the predetermined three intersections among intersections of a plurality of lines dividing the bed portion and to the center position of the bed portion with the laser ranging sensor, dimensions to boundary points of respective regions divided by the plurality of lines are calculated.

7. A non-transitory computer-readable storage medium for storing a calibration program of calibrating a conversion parameter, the calibration program being a program which causes a processor to perform processing, the processing comprising:

measuring, with a laser ranging sensor, markers attached to at least two predetermined positions of a bed portion of a trampoline and calculating coordinates of the markers in a first coordinate system with a position of the laser ranging sensor being an origin;

adjusting, based on a relationship between the calculated coordinates of the markers and the at least two predetermined positions of the bed portion, the conversion parameter to be used for converting coordinates of respective positions of the first coordinate system into coordinates of respective positions of a second coordinate system with a center position of the bed portion being an origin;

storing the adjusted conversion parameter in a memory, to use the adjusted conversion parameter stored in the memory to convert a measured position from the first coordinate system into the second coordinate system.

8. A data processing apparatus comprising:

a memory; and a processor coupled to the memory, the processor being configured to execute a first calculation processing that includes measuring, with a laser ranging sensor, markers attached to at least two predetermined positions of a bed portion of a trampoline, and calculating coordinates of the markers in a first coordinate system with a position of the laser ranging sensor being an origin; and execute a second calculation processing that includes calculating a conversion parameter to convert coordinates of respective positions of the first coordinate system into coordinates of respective positions of a second coordinate system with a center position of the bed portion being an origin based on a relationship between the calculated coordinates of the markers and the at least two predetermined positions of the bed portion.

* * * * *